US008045926B2

(12) United States Patent  (10) Patent No.: US 8,045,926 B2
Martikkala et al.  (45) Date of Patent: Oct. 25, 2011

(54) MULTI-TRANSCEIVER ARCHITECTURE FOR ADVANCED TX ANTENNA MONITORING AND CALIBRATION IN MIMO AND SMART ANTENNA COMMUNICATION SYSTEMS

(75) Inventors: Risto Martikkala, Oulu (FI); Kauko Heinikoski, Oulu (FI); Pekka Adolfsen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 570 days.

(21) Appl. No.: 12/252,166

(22) Filed: Oct. 15, 2008

(65) Prior Publication Data

US 2010/0093282 A1  Apr. 15, 2010

(51) Int. Cl.
*H04B 15/00* (2006.01)
*H04B 17/00* (2006.01)
(52) U.S. Cl. ............... 455/63.4; 455/63.1; 455/67.16
(58) Field of Classification Search ............ 455/63.4, 455/63.1, 67.16, 60, 139, 205, 276.1, 303, 455/304, 73; 370/350, 204, 339, 516; 375/267, 375/148, 254, 260, 346, 347
See application file for complete search history.

(56) References Cited

U.S. PATENT DOCUMENTS 7,564,910 B2 *  7/2009  Kostic ........................ 375/260
7,769,097 B2 *  8/2010  Sandhu ........................ 375/267
7,944,987 B1 *  5/2011  Sarrigeorgidis ............ 375/267
2009/0180466 A1 *  7/2009  Soul et al. ..................... 370/350

* cited by examiner

*Primary Examiner* — Eugene Yun

(57) ABSTRACT

Exemplary embodiments of system and method are provided for measuring signal amplitude, phase and/or delay offsets between multiple transmit signals fed through the transmit signal processing chains and wirelessly transmitted over the transceive antennas of separate transceiver modules, wherein transmit signal coupling between the transmit antennas of said transceiver modules' transmit signal processing chains may be used for synchronizing the transmit signals and calibrating their amplitude, phase and/or delay parameters. The exemplary embodiments further provide a front end arrangement of a wireless transceiver device which can comprise at least two independently controllable transceiver modules, each connected to an associated spatial diversity transceive antenna and comprising at least one associated transmit signal processing chain and at least one associated receive signal processing chain coupled to a common baseband processing unit. The exemplary transceiver architecture can be executed on an antenna loop between the transmit signal processing chain of a first transceiver module and the transmit signal processing chain of a second transceiver over the air interface and relies on an adaptive antenna concept which facilitates a wireless transmission of data via a plurality of wireless communication channels utilizing an array of transceive antennas, receiving feedback information via at least one of said communication channels using such antenna loop and modifying a transmission mode based on the received feedback information.

42 Claims, 12 Drawing Sheets

Procedure:

The same Tx signal is fed both to transceiver module $TRXM_1'$ and transceiver module $TRXM_2'$
In both transceiver modules, the signal time offset between the respective local Tx-to-SMAB feedback loop ($LFL_1$ or $LFL_2$) and the input baseband processing unit BPU is measured. (The LFL loops can be used to identify timing differences between and failures in the feedback chains.)
After that the relative signal time offset between antenna loops $AL_{12}$ and $AL_{21}$ is determined. ($AL_{12}$ and $AL_{21}$ are identical excluding the CFL loop portions. Delay variations between the feedback parts are partly covered by the processing measurement step.) The result represents the difference in time of arrival of baseband signal to the SMAB inputs of transceiver modules $TRXM_1'$ and $TRXM_2'$, i.e., a timing uncertainty between the BPU and the two transceiver modules.
The determination carried out by comparing the delays of an RF signal transferred via $AL_{12}$ and $AL_{21}$, measured at $SMAB_1$ or $SMAB_2$.
The time of arrival difference can be removed by adjusting the latency through the other or both SMAB blocks in the transceiver modules and repeating the measurement and determination steps mentioned above to verify that both antenna loops (AL12 and AL21) produce the same delay value.

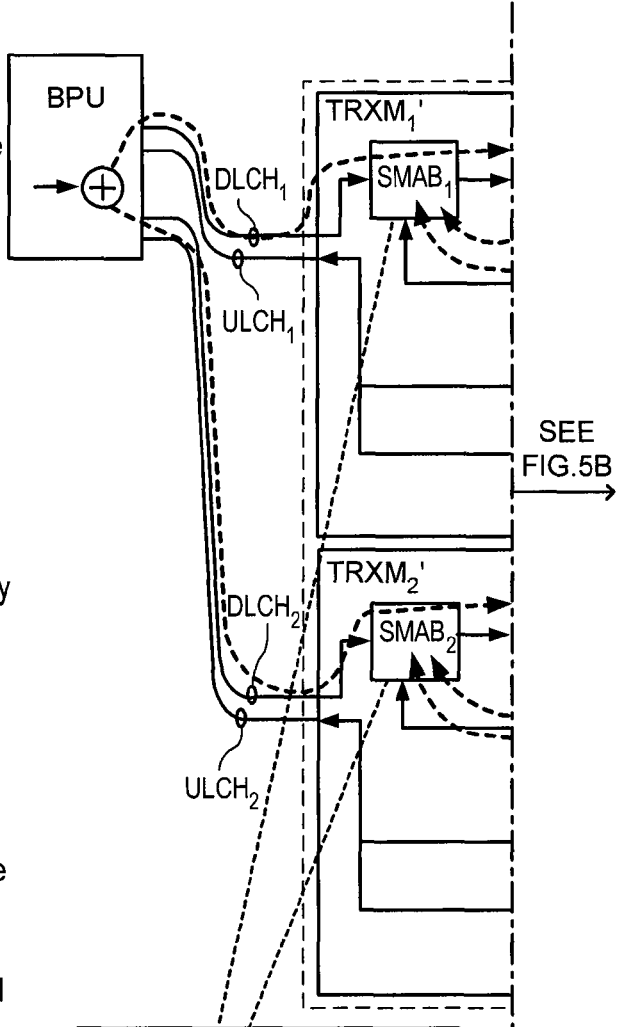

Measurement of time offset between input baseband signal and antenna loop signal originating from the other transceiver module or measurement of input baseband signal and local Tx-to-SMAB feedback signal

FIG. 5A

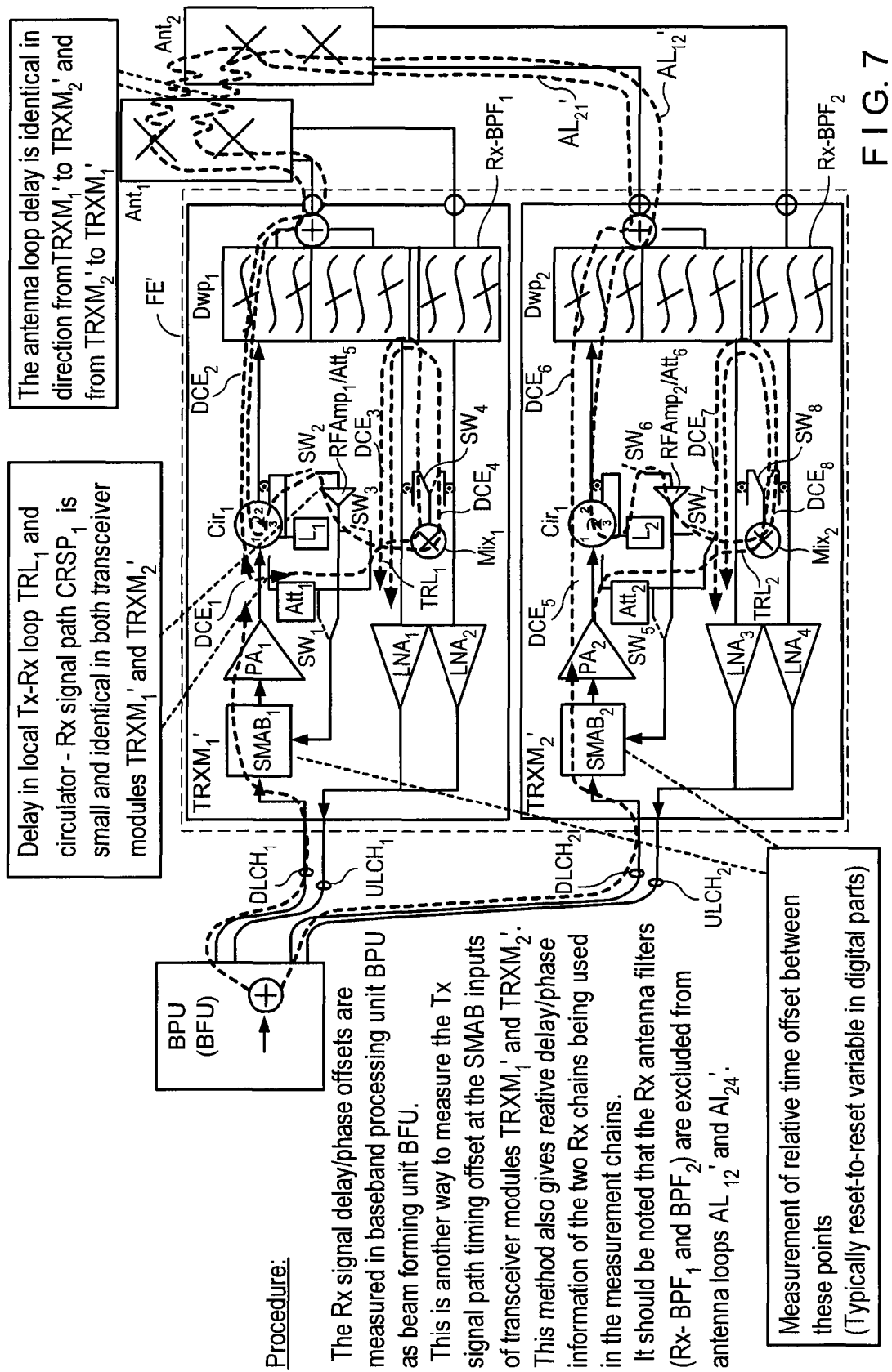

Procedure
Same transceiver triplets which were used in production calibration are measured and adjusted in the field calibration.
* As first step, measure timing/space offset between two transmit chains with antenna loop to third transceiver chain. Read the production calibration value (same transceiver/measurement set-up) from calibration data base and calculate the difference between the field measurement and calibration data value. The other transceiver is regarded as "ideal" or calibrated, while the timing/phase of the other measured transceiver is adjusted by calculated difference. The adjustment may be made in the transceiver parts or in the common baseband processing unit. A new measurement after the adjustment is applied should equal to the production calibration value, i. e., the difference is zeroed. After this both measured transceivers are regarded calibrated.
* Select either one of calibrated Transceivers as an "ideal" or calibrated transceiver to be measured, and select a new transceiver to perform the measurement and another new one as transceiver to be calibrated, the triplet being selected such that there is production calibration value available the measurement configuration. Perform timing/phase measurement and adjust the new-to-be-calibrated transceiver to zero error between calibration data and the measurement value.
* Step through all required measurement/adjustment steps at least for once.
* As result, the smart antenna system is calibrated and is capable of generating the same ideal beam that was used in production calibration.

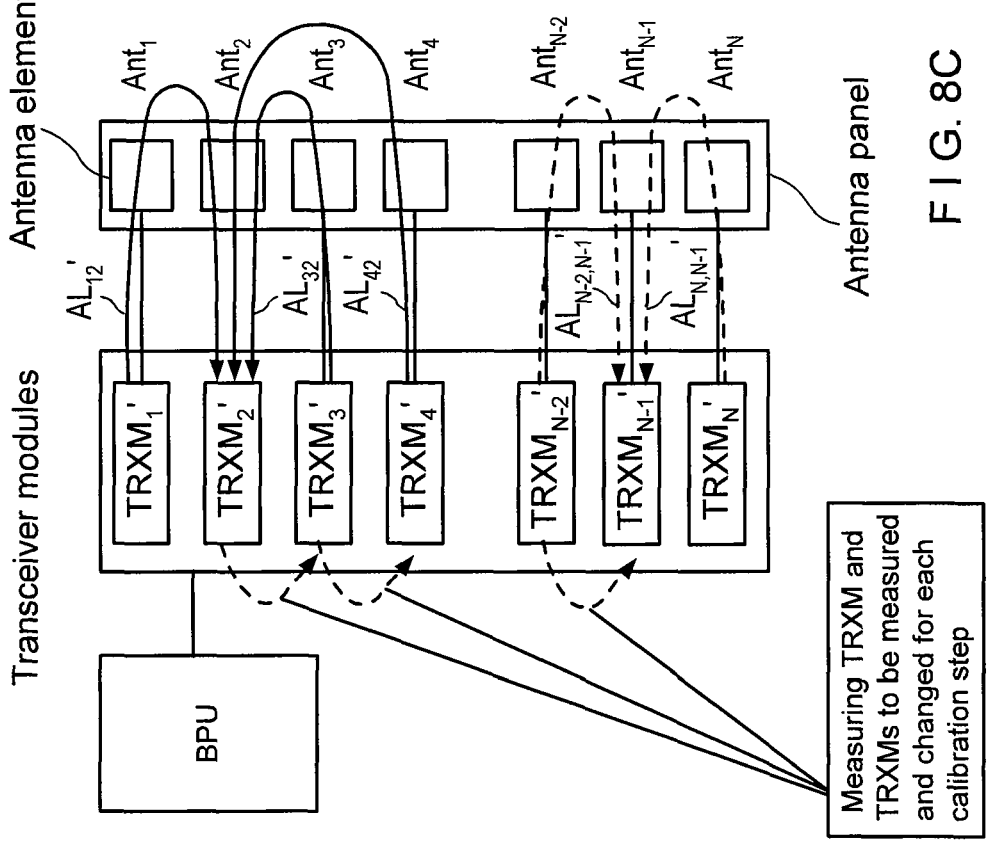

FIG. 8C

MULTI-TRANSCEIVER ARCHITECTURE FOR ADVANCED TX ANTENNA MONITORING AND CALIBRATION IN MIMO AND SMART ANTENNA COMMUNICATION SYSTEMS

FIELD OF THE INVENTION

Exemplary embodiments of the present invention relates to the field of multi-transceiver architectures for use in a multiple-input multiple-output (MIMO) spatial multiplexing system or smart antenna system with adaptive beamforming and advanced transmit (Tx) signal monitoring capability. More particularly, the exemplary embodiments of the present invention refers to a system and method for measuring signal amplitude, phase and/or delay offsets between multiple transmit signals fed through the Tx signal processing chains and wirelessly transmitted over the Tx/Rx antennas of separate transceiver modules.

BACKGROUND INFORMATION

It is possible to apply the principles of the exemplary embodiments of present invention to the scope of MIMO spatial multiplexing or smart antenna system with spatial diversity, adaptive beamforming and advanced Tx signal monitoring capability as provided herein. Thus, it may be beneficial to provide a brief overview of these systems so as to better understand for which subject matters patent protection is sought.

With advances in digital signal processing integrated circuits, multiple-antenna multiple-output (MIMO) systems have emerged in which mobile terminals incorporate smart antenna systems comprising multiple transmit antennas and multiple receive antennas and apply spatial diversity techniques to transmit multiple versions of a signal. These spatial diversity techniques provide effective ways to combat multipath fading and to significantly mitigate co-channel interference in a wireless communication system. One important concept in spatial diversity is that the propagation of multiple versions of an RF signal from different antennas ("spatial stream") may significantly reduce the probability of flat fading at the receiving mobile terminal since not all of the transmitted signals would have the same dead zone.

Recently, MIMO spatial multiplexing systems with a first antenna array consisting of multiple transmit antennas on a wireless transmitter side and a second antenna array consisting of multiple receive antennas on a wireless receiver side are becoming increasingly popular, which is owing to the fact that these systems provide an increased data rate without the need for an increase in signal bandwidth since the applied transmit antennas are able to transmit independent data streams. These in dependent data streams, however, can interfere with each other such that a complex channel equalizer is required at the wireless receiver side in order to separate RF signals received via different signal propagation paths. Furthermore, antenna diversity gain is reduced due to the correlation of the channel impulse responses of the wireless signal propagation paths between the transmit antennas of the antenna array on the wireless transmitter side and the receive antennas of the antenna array on the wireless receiver side. Using a compact space diversity receiver in handheld phones and portable terminals ensures that received RF signals will be at least partially correlated due to the compact nature of the antenna array in which antenna elements are typically spaced by a distance of a fraction of the RF signal wavelength.

Conventional smart adaptive antenna systems can combine multiple antenna elements with a signal processing capability to optimize the pattern of transmitted signal radiation and/or reception in response to the communications medium environment. The process of optimizing the pattern of radiation can be referred to as "adaptive beamforming", which may utilize linear array mathematical operations to increase the average signal-to-noise ratio (SNR) by focusing energy in desired directions. In brief, adaptive beamforming is a technique in which an array of antennas is exploited to achieve maximum reception in a specified direction by estimating the signal arrival from a desired direction (in the presence of noise) while signals of the same frequency from other directions are rejected. At the same time, in transmit direction, the smart antenna base station generates either a group of fixed beams or a group of dynamically directionally steerable beams and, based on the location, i.e. the direction of the mobile unit, sends the downlink signal to that particular mobile unit only to the fixed beam which covers the location of the mobile unit best or adjusts the direction of a steerable beam to best cover said mobile unit. This is achieved by varying the weights of each of the sensors (antennas) used in the array. In adaptive beamforming, the optimum weights are iteratively computed using complex algorithms based upon different criteria.

MIMO systems with beamforming capability can facilitate simultaneous transmission of multiple signals occupying a shared frequency band, similar to what may be achieved in code division multiple access (CDMA) systems. For example, the multiplicative scaling of signals prior to transmission, and a similar multiplicative scaling of signals after reception, may facilitate a specific antenna at a receiving mobile terminal to receive a signal which had been transmitted by a specific antenna at the transmitting mobile terminal to the exclusion of signals which had been transmitted from other antennas. However, MIMO systems may not require the frequency spreading techniques used in CDMA transmission systems. Thus, MIMO systems may make more efficient utilization of frequency spectrum.

SUMMARY OF EXEMPLARY EMBODIMENTS OF THE INVENTION

One of the challenges in the implementation of a smart antenna or MIMO system can be that there are several sources of timing, phase and amplitude uncertainties which should be compensated in start-up and during normal operation of the system. Such exemplary uncertainties can be due to reset-to-reset variation of delays in the digital parts of the complex system and due to thermal drift and aging in the analog parts of the system. Exemplary embodiments of the present invention provide a method for calibrating specially the downlink signal paths of a smart antenna or MIMO base station in production and during runtime operation. The exemplary method may also be used for diagnosis of separate signal paths and signal quality.

Antenna looping between different transceiver modules of a wireless transceiver device with spatial antenna diversity for use in a smart antenna or MIMO base station normally requires external systems components in addition to "ordinary" RF front ends and baseband processing units of such a wireless transceiver device, thus making said transceiver device more expensive and complex. Conventionally, external loop devices have been used for measuring multiple wireless transceiver signals, such as, e.g., site test mobiles, internal wireless transceiver/WCDMA loops covering only loops within a single transceiver module, and additional calibration modules, such as e.g. for smart antenna beamforming adjustment feedback.

The conventional smart antenna systems provide a wireless transceiver's active signal path that is normally open-circuited or shorted when detecting an antenna line failure. The RF signal power is then reflected back towards the power amplifier in the Tx signal processing chain of the corresponding transceiver. If a post-circulator directional coupler is used to couple part of this reflected power to an integrated power detector, the failure may be detected, but the detected reflected power may depend on the distance from the failure point to the directional coupler. Moreover, the reflected signal power may also be detected from the third port of a circulator that is normally placed at the output of the power amplifier. Just using reflected power detection for quality diagnostics is quite limited in fault detection sensitivity and capability to detect signal quality degradation transmitted to the air.

Thus, one of the objects of the present invention is to provide a system and method for advanced Tx signal monitoring for measuring signal amplitude, phase and/or delay offsets between multiple transmit signals fed through the Tx signal processing chains and wirelessly transmitted over the Tx/Rx antennas of separate transceiver modules in a multi-transceiver architecture for use in a multiple-input multiple-output (MIMO) spatial multiplexing system or smart antenna system with direction of arrival, adaptive beamforming and advanced Tx signal monitoring capability.

For example, according to the exemplary embodiments of the present invention, a system and method can be provided for measuring signal amplitude, phase and/or delay offsets between multiple transmit signals fed through the Tx signal processing chains and wirelessly transmitted over the Tx/Rx antennas of separate transceiver modules. For example, transmit signal coupling between the Tx/Rx antennas of said transceiver modules' Tx signal processing chains may be used for synchronizing said transmit signals and calibrating their amplitude, phase and/or delay parameters. The exemplary embodiments of the present invention can also provide a front end of a wireless transceiver device which can comprise at least two independently controllable transceiver modules, e.g., each connected to an own spatial diversity Tx/Rx antenna and each comprising at least one own Tx signal processing chain as well as at least one own Rx signal processing chain coupled to a common baseband processing unit. The exemplary transceiver architecture can thereby facilitate the execution of an antenna loop between the Tx signal processing chain of a first transceiver module and the Tx signal processing chain of a second transceiver module over the air interface and may rely on an adaptive antenna concept which facilitates a wireless transmission of data via a plurality of wireless communication channels utilizing an array of Tx/Rx antennas, receipt of feedback information via at least one of said communication channels by using such an antenna loop and a modification of a transmission mode based on the received feedback information.

The exemplary embodiments of the present invention can be used for an establishment and field calibration of the transmit signal paths in a smart antenna system by receiving the antenna-coupled signals from two transmit chains to a third transmit chain, where these signals are routed to a signal measurement and adjustment block of a third transmit chain for precise amplitude, timing and phase measurement. Further, in a large smart antenna system, the measured and measuring transmit chains can be altered to cover all transmit chains. For example, the exemplary embodiments of the method according to the present invention can be useful when the smart antenna system is calibrated to produce an optimized, known antenna beam, a sufficient number of phase offset measurements between different antenna loop signal paths is executed, said phase offset measurements are stored in non-volatile media in the smart antenna system and when these measured offsets are used as reference data when the smart antenna system is activated to field operation. In an exemplary field operation, e.g., the same antenna loop measurements are executed, and the amplitude, timing and phase offsets of the transmit chains under measurement are adjusted by the beam steering entity of the smart antenna system to equal to the reference data of that particular loop.

In view of the above, a first exemplary embodiment of the present invention can provide a front end of a multi-transceiver system architecture for use in a wireless MIMO spatial multiplexing system. The exemplary multi-transceiver system architecture can comprise a first transceiver module and an independently controllable second transceiver module, in which each transceiver module comprises an own Tx/Rx antenna and at least one own Tx signal processing chain and at least one own Rx signal processing chain with each of these signal processing chains being connected to a common baseband processing unit. The exemplary baseband processing unit can generate the same baseband signal to both Tx signal processing chains.

According to this exemplary embodiment, the front end can comprise a built-in feedback mechanism which allows to measure amplitude, timing and phase offsets by means of a signal measurement and adjustment block integrated into a digital predistortion system in the Tx signal processing chain of the second transceiver module. The offsets can be measured between an RF signal generated in the first transceiver module, and the signal may be first coupled via an antenna loop from the Tx/Rx antenna of the first transceiver module to the Tx/Rx antenna of the second transceiver module and then forwarded to the signal measurement and adjustment block, and the corresponding Tx baseband signal of this RF signal. Tx baseband signal can be generated by the common baseband processing unit and fed to the same signal measurement and adjustment block of the second transceiver module.

In addition, the feedback mechanism can facilitate a measurement of amplitude, timing and phase offsets by means of a signal measurement and adjustment block integrated into a digital predistortion system in the Tx signal processing chain of the first transceiver module. The offsets can be measured between the same RF signal generated in the second transceiver module. Such exemplary signal can be first coupled via a reverse antenna loop from the Tx/Rx antenna of the second transceiver module to the Tx/Rx antenna of the first transceiver module, and then forwarded to the signal measurement and adjustment block of the first transceiver module, and the Tx baseband signal received from the common baseband unit and provided to the signal measurement and adjustment block of the first transceiver module.

According to this exemplary embodiment, the respective integrated signal measurement and adjustment blocks of the digital predistortion systems in the Tx signal processing chains of the first and second transceiver module can facilitate an operation at a higher sampling rate and dynamic range than available for the common baseband processing unit.

The exemplary sample rate and sample width for the baseband samples transferred between the digital signal processing parts of the common baseband unit and the radio parts of the particular transceiver modules are defined in two widely used industry standards, e.g., the CPRI (Common Public Radio Interface) specification and the OBSAI (Open Base Station Architecture Initiative) RP3 specification. When antenna samples are delivered from the radio units to the common baseband unit for smart antenna processing and smart antenna system calibration, this interface can limit the dynamic range and the bandwidth of the signal.

In the CPRI specification, the uplink antenna samples originating from a radio unit RE (Radio Equipment) and provided towards a common baseband processing unit REC (Radio Equipment Control) can be transferred at double chip rate, equal to 7.68 Msps (mega-samples per second) as complex base band samples composed of 7-bit in-phase (I) and 7-bit quadrature (Q) samples, both given in the two's complement data format. In the OBSAI RP3 specification, the corresponding figures are dual chip rate and 8-bit sample width.

When the antenna signals are processed in the signal measurement and adjustment block integrated into the digital predistortion parts in the Tx signal processing chains of the transceiver modules, the sample rate can be typically between about 50 and 200 Msps, and the sample width can correspond to the analog-to-digital converter width, typically between about 12 and 16 bits. Furthermore, these feedback samples provide a wider band than the carrier bandwidth as the predistortion needs to cancel the ACP1 and ACP2 (adjacent channel power), thus the measurements can have a significantly better resolution than when measurements are performed in the common baseband processing unit.

According to the above-described embodiment, each of the first and second transceiver modules may either be accommodated within the same physical RF module or unit or within a different RF module or unit of the exemplary multi-transceiver system architecture.

The exemplary embodiment of the common baseband processing unit may be implemented by a number of separate baseband processing units that communicate with each other or by a single baseband processing unit. Alternatively or in addition, the exemplary baseband processing functionality may be integrated into the particular transceiver modules.

According to this exemplary embodiment, the Tx signal processing chain(s) of the second transceiver module may comprise a first coupling element, which may be provided by a post-circulator directional coupler integrated into the Tx signal processing chain(s) of the second transceiver module, for coupling out a portion of an RF signal which has been received by the Tx/Rx antenna associated with the second transceiver module (which can also be referred to as "reverse signal") as well as a first switching element for switchably feeding this received RF signal portion via the at least one Rx signal processing chain of the second transceiver module back to the common baseband processing unit.

In case of a duplex system, the Tx signal processing chain(s) of the second transceiver module may additionally comprise an up-/down-conversion mixer for converting the received signal portion to be supplied to the baseband processing chain to the Rx band or, alternatively, a controlling mechanism for adjusting the operating frequency of an RF signal forwarded by the Rx signal processing chain of the second transceiver module to the operating frequency of the used Tx channel. The at least one Tx signal processing chain of the first transceiver module may thereby comprise the logically equivalent coupler, switch and mixer.

The exemplary first coupling element may thereby be used for sampling the reverse signal from the antenna direction. As an alternative to the first coupling element, the reverse signal may be obtained from a load port of the circulator or given by a sampled output of said circulator's load port. The first switching element may be connected to an output terminal of the first directional coupling element at which the coupled out signal portion of the received RF signal is supplied, to the load port of said circulator or to the sample port of the circulator. In case of a duplex system, the Rx signal processing chain can be tuned to use the Tx channel frequency, and/or the looped Tx signal may be converted to the Rx band during the loop measurement. The Tx signal processing chain(s) of the first transceiver module may then comprise the logically equivalent circulator, switch and mixer.

According to another aspect of this exemplary embodiment, the load port of the circulator may either be coupled to the signal measurement and adjustment block integrated into the Tx signal processing chain of the second transceiver module and/or to the at least one own Rx signal processing chain of the second transceiver module.

Moreover, the first transceiver module can comprise a second coupling element, which may be provided by a directional coupler integrated into the Tx signal processing chain(s) of the first transceiver module, for coupling out a portion of an RF signal to be wirelessly transmitted by the Tx/Rx antenna of the first transceiver module via the at least one Tx signal processing chain of this transceiver module and at least one second switching element for switchably feeding this signal portion to a third directional coupling element used for coupling in this signal portion to the at least one Rx signal processing chain of the first transceiver module so as to feed it back to the common baseband processing unit. The second switching element may thereby be connected to an output terminal of the second directional coupling element at which the coupled out RF transmit signal portion is supplied.

In case of an exemplary duplex system, the Rx signal processing chain can be tuned to use the Tx channel frequency, and/or the looped Tx signal may be converted to the Rx band during the loop measurement. The Tx signal processing chain(s) of the first transceiver module may therefore additionally comprise an up/down-conversion mixer for converting the received signal portion to be supplied to the baseband processing chain to the Rx band or, alternatively, a controlling mechanism for adjusting the operating frequency of an RF signal forwarded by the Rx signal processing chain of the first transceiver module to the operating frequency of the used Tx channel. The second transceiver module may thereby comprise the logically equivalent circulator, couplers, switches and mixer.

In a transmission direction of the first transceiver module, the second directional coupling element may be pre-connected to a first circulator which serves for directing the signal flow of an RF signal to be transmitted via the Tx signal processing chain of the first transceiver module to the Tx/Rx antenna associated with this transceiver module. The second transceiver module may thereby use the same order in connectivity between the logically equivalent coupler and circulator.

In the transmission direction of the second transceiver module, the first directional coupling element is post-connected to a second circulator which can direct the signal flow of an RF signal to be transmitted via the Tx signal processing chain of the second transceiver module to the Tx/Rx antenna associated with this second transceiver module. The first transceiver module ($TRXM_1$, $TRXM_1'$) may thereby use the same order in connectivity between logically equivalent coupler and circulator.

Preferably, the first transceiver module may additionally comprise at least one attenuation element with an adjustable attenuation factor for attenuating the signal amplitude of the coupled out RF transmit signal portion. For example, the attenuation element may be integrated into a first feedback chain for feeding a portion of an RF signal to be transmitted by the Tx/Rx antenna associated with the first transceiver module back to the at least one own Rx signal processing chain of the first transceiver module. The second transceiver module may thereby comprise the logically equivalent attenuators. The second transceiver module may additionally comprise at least one amplification and/or attenuator element for weighting the signal amplitude of the coupled in RF receive signal portion with an adjustable gain factor. The amplification/attenuator element may be integrated into a second feedback chain for feeding a portion of an RF signal received from the Tx/Rx antenna associated with the second transceiver module back to the at least one own Rx signal processing chain of the second transceiver module. In case of the exemplary duplex system, the Rx signal processing chain can be tuned to use the Tx channel frequency, and/or the looped Tx signal must be converted to the Rx band during the loop measurement. The first transceiver module may thereby comprise the logically equivalent amplifier/attenuator.

Further, according to a further aspect of this exemplary embodiment, the first feedback chain can be coupled to a first signal measurement and adjustment block preconnected to at least one first power amplifier in the at least one Tx signal processing chain of the first transceiver module. The first signal measurement and adjustment block may be configured for accurate phase/timing offset measurements between the RF signal received via the first feedback chain and the Tx baseband signal received from the common baseband processing unit for delay calibration of the MIMO system.

The second feedback chain may be coupled to a second signal measurement block which, in upstream direction of the at least one Tx signal processing chain of the second transceiver module, can be post-connected to the circulator of the at least one power amplifier in this at least one Tx signal processing chain. The second signal measurement and adjustment block may be configured for measuring the time and phase offset between the Tx baseband signal received from the common baseband processing unit and the first RF signal originating from the first transceiver module and received by the Tx/Rx antenna associated with the second transceiver module.

Such exemplary procedure and configuration can facilitate a measurement of the first transceiver module's transmission looped back to the second transceiver module (or vice versa) using, e.g., the antennas associated with the first and second transceiver module, respectively, while the second transceiver module's own transmission can be carried out via an adjacent channel within the same Tx band or, in case of having the same frequency, is shut off or made lower in level during the measurement of the second transceiver module's transmission. In case of an exemplary CDMA system, signals may be separated by use of dedicated code channels, and in LTE separate resource blocks may be used for separate antenna loop paths. The above-described exemplary antenna loop measurement may also be performed in reverse signal direction by activating a measurement in the first transmit chain, by activating the second feedback path in the first transmit chain and by activating the transmission of the RF signal to be measured at the second transceiver module.

The exemplary delay calibration of the MIMO system may be executed for two transmit chains by first measuring the local feedback loop delay through the first feedback chain as described above for both transmit chains separately, secondly by measuring the inter-antenna loop delays using the second feedback loop separately for both transmit chains being used as the measuring transceiver and thirdly by comparing the measurements. Comparison of the local feedback loop measurements detects if the two transceivers have significant difference in the transmitter to local feedback loop signal paths. Comparison of the two antenna loop measurements indicates mainly the timing offset between the transceiver baseband inputs, because most of the unit-to-unit delay-variable parts of the transmit chain are included in both antenna loop measurements that were executed and because the first local loop measurement, if indicated the same latency for the two transmit-feedback loops, included most of the remaining part of the antenna loop signal path. The timing offset between the baseband inputs of the two transmit chains may be compensated either by using the signal measurement and adjustment blocks of the transceivers, by using some other adjustment in the transceivers or by applying the correction in the common baseband processing unit.

According to a second exemplary embodiment of the present invention, a multi-transceiver system architecture can be provided for use in a wireless MIMO spatial multiplexing system. The exemplary multi-transceiver system architecture can comprise a first transceiver module and an independently controllable second, third and optional further transceiver module(s) with each transceiver module having an own Tx/Rx antenna and comprising at least one own Tx signal processing chain with each of these signal processing chains being connected to a common baseband processing unit. The baseband processing unit can generate the same baseband signal to each Tx signal processing chain. According to this exemplary embodiment, the multi-transceiver system architecture can comprise a built-in feedback mechanism which facilitates a measurement of amplitude, timing and phase offsets using a signal measurement and adjustment block integrated into a digital predistortion system in the Tx signal processing chain of the second transceiver module.

The exemplary offsets can be measured between an RF signal generated in the first transceiver module, which signal is first coupled via an antenna loop from the Tx/Rx antenna of the first transceiver module to the Tx/Rx antenna of the second transceiver module and then forwarded to the signal measurement and adjustment block, and the corresponding Tx baseband signal of this RF signal. The exemplary Tx baseband signal can be generated by the common baseband processing unit and fed to the same signal measurement and adjustment block of the second transceiver module. The amplitude, timing and phase offset may then be measured by the signal measurement and adjustment block of the second transceiver between the RF signal generated in the third (or other) transceiver module. The signal can be first coupled via an antenna loop from the Tx/Rx antenna of the third (or other) transceiver module to the Tx/Rx antenna of the second transceiver module and then forwarded to the signal measurement and adjustment block, and the corresponding Tx baseband signal of this RF signal, said Tx baseband signal being generated by the common baseband processing unit and fed to the same signal measurement and adjustment block of the second transceiver module.

In addition, the exemplary feedback mechanism facilitates a measurement of amplitude, timing and phase offsets using further signal measurement and adjustment blocks integrated into the Tx signal processing chains of the first, the third and other transceiver modules of the multi-transceiver system. The offsets can be measured separately between the input Tx baseband signal of the measuring transceiver module and two RF signals from two other transceiver modules. According to this exemplary embodiment, the integrated signal measurement and adjustment block of the digital predistortion system in the Tx signal processing chain of the second transceiver module can be operated at a higher sampling rate and dynamic range than available for the common baseband processing unit.

In this exemplary arrangement, one transceiver module acts as measurement path for comparing the phase and amplitude of the signals originating from two other transmit chains. The measurement reference point can be considered to be in the Tx/Rx antenna of said measuring transmit chain and thus the absolute phase, delay or gain of the measurement signal path through the involved said measuring transceiver Tx and Rx parts do not cause error into said measurement.

As described above with reference to the first exemplary embodiment, some or all of the transceiver modules may either be accommodated within the same physical RF module or unit or within a different RF module or unit of the multi-transceiver system architecture.

According to a third exemplary embodiment, the at least one Tx signal processing chain of the second transceiver module comprises a directional coupling element, integrated into the at least one Tx signal processing chain of the second transceiver module, for coupling out a portion of an RF signal which has been received by the Tx/Rx antenna associated with the second transceiver module as well as a switching element for switchably feeding this received RF signal portion via the at least one Rx signal processing chain of the second transceiver module back to the common baseband processing unit. The switching element may thereby be connected to an output terminal of the directional coupling element at which the coupled out signal portion of the received RF signal is supplied. In an exemplary duplex system, the Rx signal processing chain must either be tuned to use the Tx channel frequency, or the looped Tx signal must be converted to the Rx band during the loop measurement.

In the transmission direction of the second transceiver module, which can act as the measuring transceiver module, the directional coupling element may be post-connected to a circulator which serves for directing the signal flow of an RF signal to be transmitted via the Tx signal processing chain of the second transceiver module to the Tx/Rx antenna associated with this second transceiver module. The directional coupler can sample the reverse signal, i.e., the signal from Tx/Rx antenna towards the power amplifier. According to yet another exemplary embodiment, the directional coupler may be replaced by a signal taken from a third port (e.g., load port) of the said circulator or by a signal taken from a sample port of said circulator's load.

According to a fourth exemplary embodiment, a feedback chain, integrated into the second transceiver module, can be used for feeding a portion of an RF signal received from the Tx/Rx antenna associated with the second transceiver module (=the reverse signal) or, alternatively, the signal taken from the circulator's third port (load port) or a signal taken from a sample port of the circulator's load, back to the at least one own Rx signal processing chain of the second transceiver module. Using this exemplary feedback chain, the first and third transceiver modules (and possibly additional transceiver modules) may be coupled via antenna loops to the at least one own Rx signal processing chain and to the common baseband processing unit.

In case the antenna loop signals received from other transceiver modules are coupled to the measuring transceiver module's Rx signal processing chain as described above with reference to the third exemplary embodiment, the common baseband module may perform the amplitude, timing and phase offset measurement with both antenna loop signals being simultaneously active, while in case the antenna loop signals can be coupled to the signal measurement and adjustment block of the measuring transceiver module as described with reference to the second exemplary embodiment, the measurements can be made by comparing the antenna looped signals to the Tx baseband signal.

For a comparative measurement using the signal measurement and adjustment block, only one antenna-looped signal originating from any one of the first, third or other transceiver modules must be activated at the same time to correlate it with the input data of the measuring second transceiver module. The other looping transceiver modules may send non-correlating data, and/or they may be shut off, tuned to other frequency or tuned to a lower power.

According to a further aspect of the second and third embodiments, the measuring Tx signal processing chain and the two or more Tx signal processing chains to be compared may be configured for cyclically changing their roles and repeating an amplitude, timing and/or phase offset measurement for at least N−1 separate Tx signal chains acting in the role of said measurement chain, whereas N is an integer representing the total number of operated Tx signal processing chains, such that each RF signal generated in a corresponding one of the Tx signal processing chains to be compared has been looped from said Tx signal processing chain to at least one measurement chain for at least once over the full cycle of the at least N−1 measurements.

According to a fourth exemplary embodiment of the present invention is dedicated to a method for measuring amplitude, timing and phase offsets in a multi-transceiver system for use in a wireless MIMO spatial multiplexing system, wherein the multi-transceiver system architecture comprises at least two individually operated transceiver modules with each transceiver module having an own Tx/Rx antenna and comprising at least one own Tx signal processing chain with each of these signal processing chains being connected to a common baseband processing unit, said baseband processing unit generating the same baseband signal and feeding it to both Tx signal processing chains.

According to this exemplary embodiment, the amplitude, timing and phase offsets can be measured using a signal measurement and adjustment block integrated into a digital predistortion system in the Tx signal processing chain of the second transceiver module between an RF signal generated in the first transceiver module. The signal can be first coupled via an antenna loop from the Tx/Rx antenna of the first transceiver module to the Tx/Rx antenna of the second transceiver module and then forwarded to the signal measurement and adjustment block, and the corresponding Tx baseband signal of this RF signal. The Tx baseband signal can be generated by the common baseband processing unit and fed to the same signal measurement and adjustment block of the second transceiver module.

In addition, further amplitude, timing and phase offsets may be measured by means of a signal measurement and adjustment block integrated into a digital predistortion system in the Tx signal processing chain of the first transceiver module between an RF signal generated in the second transceiver module. The signal can be first coupled via a reverse antenna loop from Tx/Rx antenna of the second transceiver module to the Tx/Rx antenna of the first transceiver module and then forwarded to the signal measurement and adjustment block of the first transceiver module, and the Tx baseband signal received from the common baseband unit and fed to the signal measurement and adjustment block of the first transceiver module. According to this exemplary embodiment, the respective integrated signal measurement and adjustment blocks of the digital predistortion systems in the Tx signal processing chains of the first and second transceiver module can be operated at a higher sampling rate and dynamic range than available for the common baseband processing unit.

The exemplary aspects of the present invention can be used in a wireless MIMO spatial multiplexing system or smart antenna system according to the WCDMA/TDD, GSM, UMTS, WiMAX or LTE standard.

According to the fifth exemplary embodiment of the present invention, a method can be provided for measuring amplitude, timing and phase offsets in a multi-transceiver system for use in a wireless MIMO spatial multiplexing or smart antenna system, wherein the multi-transceiver system architecture comprises a first transceiver module and an independently controllable second, third and optional further transceiver module(s) with each transceiver module having an own Tx/Rx antenna and comprising at least one own Tx signal processing chain with each of these signal processing chains being connected to a common baseband processing unit, wherein said baseband processing unit generates the same baseband signal to each Tx signal processing chain. The exemplary method can comprises measuring amplitude, timing and phase offsets by means of a signal measurement and adjustment block integrated into a digital predistortion system in the Tx signal processing chain of the second transceiver module between an RF signal generated in the first transceiver module. The signal can be first coupled via an antenna loop from the Tx/Rx antenna of the first transceiver module to the Tx/Rx antenna of the second transceiver module and then forwarded to the signal measurement and adjustment block, and the corresponding Tx baseband signal of this RF signal. The Tx baseband signal can be generated by the common baseband processing unit and fed to the same signal measurement and adjustment block of the second transceiver module.

In addition, the exemplary method can further comprise measuring further amplitude, timing and phase offsets by means of the signal measurement and adjustment block between at least one further RF signal generated in the third transceiver module or any one from the optional further transceiver modules. The signal can be first coupled via a reverse antenna loop from the Tx/Rx antenna of the third transceiver module or any one from the optional further transceiver modules to the Tx/Rx antenna of the second transceiver module and then forwarded to the signal measurement and adjustment block, and the Tx baseband signal received from the common baseband unit and fed to the signal measurement and adjustment block of the second transceiver module.

Thereafter, such exemplary measurements may be compared with each other, and the timing/phase differences between each pair of these measurements are interpreted as the timing/phase difference between the first RF signal and the at least one further RF signal at the Tx/Rx antenna of the second transceiver module. According to this exemplary embodiment, the integrated signal measurement and adjustment block of the digital predistortion system in the Tx signal processing chain of the second transceiver module is operated at a higher sampling rate and dynamic range than available for the common baseband processing unit.

The fifth exemplary embodiment may comprise the steps of cyclically changing the roles of a measuring Tx signal processing chain and the two or more Tx signal processing chains to be compared and repeating the amplitude, timing and phase offset measurement through at least N−1 Tx signal chains acting in the role of said measurement chain, whereas N is an integer representing the total number of operated Tx signal processing chains, such that each RF signal generated in one of the Tx signal processing chains to be compared has been looped from said Tx signal processing chain to the respective measurement chain for at least once in the complete measurement cycle of the at least N−1 measurements.

For example, such exemplary method may comprise generating a transmit antenna beam with known characteristics with all Tx signal processing chains being active, carrying out a measurement step or several measurement steps as described above with reference to the fourth exemplary embodiment and storing the measured and calculated amplitude, timing and phase differences to a non-volatile memory for each triplet of Tx signal processing chains consisting of a measuring Tx signal processing chain and two Tx signal processing chains to be compared in terms of their amplitude, timing and phase offsets which is involved to generate a data base of optimal amplitude, timing and phase offsets in the smart antenna system.

According to the present invention, said method may particularly be used in a wireless MIMO spatial multiplexing system or smart antenna system according to the WCDMA/TDD, GSM, UMTS, WiMAX or LTE standard.

According to a first aspect of the fifth exemplary embodiment, the exemplary method may be applied in a calibration process during the manufacturing of a multi-transceiver system architecture as described above with reference to the second exemplary embodiment, wherein Tx signal processing chains for transmitting RF signals whose amplitude, timing and phase offsets are to be measured transmit simultaneously or sequentially.

Accordingly, the other transmit chains including the measuring chain may be tuned to another channel frequency or band or switched off momentarily.

When applied in an LTE, WiMAX or GSM system, the time division may be exploited by allocating other traffic to different resource/time slots than the ongoing measurement data. On the other hand, when being applied in a WCDMA-based GSM or UMTS system, the signals from separate transmit chains may be differentiated by using different coding in the measurement paths and other signal paths.

Thereby, e.g., some measurements can be executed sequentially and some measurements run parallel. Furthermore, more than two Tx signal processing chains through which the calibration measurements may be executed to allow for more measurement data.

For example, measurements between Tx signal processing chains connected to antenna elements that are located physically close to each other in an antenna panel are used, but measurements may also be executed for antenna elements that are more distant.

The obtained measurement data may be stored to a non-volatile memory integrated into the smart antenna system, to some network element connected to a base transceiver station or to some external memory device that can be connected or disconnected to the smart antenna system.

According to a second aspect of said fifth exemplary embodiment, the exemplary method may be applied in a calibration process during a field calibration session of a multi-transceiver system architecture as described below with reference to the second exemplary embodiment. Such exemplary field calibration procedure can be carried out when the smart antenna system is activated in the field and/or after each reset and/or partial reset of said system. In the exemplary field calibration, the calibration data that was stored in production calibration is used as reference data. The same transceiver triplets used in the production calibration can be used in the measurements of the field calibration sequence. In the first measurement step, either one of the two transceiver chains to be measured is selected as a "calibrated transceiver". The time/phase offset measurement between the selected transceivers is executed and the obtained result is compared to the corresponding measurement result of the production calibration data. The difference between the field measurement and the production calibration data represents the error to be corrected. The correction can be made by changing the timing/phase of the transmit signal of the other (=non-calibrated) transceiver.

The same measurement may be repeated after correction, and the correction may be implemented in iterative way so that the correction is made in small steps and the impact of the correction is verified with new measurement to reach minimum residual error between the factory calibration value and the field measurement value. After the first step, the two transceivers being measured can be considered as "calibrated transceivers" and either or both of these can be used as a "calibrated transceiver" to calibrate another transceiver chain. The field calibration sequence can be continued by stepping through at least N−1 measurements such that the measuring transceiver is changed for each step and all transceiver chains have been calibrated against a "calibrated transceiver". Same criteria as for the exemplary production calibration steps may be applied in the field calibration as regards parallel measurements and selection of transceiver triplets, i.e. measuring and measured transceiver chains, and the methods of optimizing the test signal for different air-interface standards such as e.g. WCDMA/TDD, GSM, LTE, UMTS and WiMax.

According to a third aspect of this fifth exemplary embodiment, the exemplary method may be applied during a run-time calibration procedure of a multi-transceiver system architecture as described above with reference to the second exemplary embodiment so as to compensate effects that may be caused by aging and thermal delay fluctuation in the system.

Thus, random transceiver modules can be measured periodically and phase adjustments are only made if certain threshold values are exceeded. It should be noted that reference data, e.g., factory or field calibration data of a calibrated system, must be available for the randomly selected transceivers.

According to a further exemplary embodiment of the present invention, antenna loops can be used between the particular transceiver modules and that the received RF signal can be routed to the common baseband processing unit or to the signal measurement and adjustment block in the Tx signal processing chain of the measuring transceiver such that the currently transmitted on-air signal quality can be measured, that in case of more than two transceiver modules any failure of the transmitting antenna lines or antennas can be detected by implementing antenna loops between the corresponding transceivers and that in case of three or more transceiver modules the exact position of a failure can be found more precisely.

Further, the exemplary embodiment of the method according to the present invention can detect a degradation of a single transceiver module by use of multiple antenna loops connecting these transceiver modules and detect that a signal path which includes the degraded part gives worse performance than any signal path that does not include the degraded part.

Other features and advantages of the present invention will become apparent upon reading the following detailed description of embodiments of the invention, when taken in conjunction with the appended claims.

BRIEF DESCRIPTION OF THE DRAWINGS

Further objects, features and advantages of the present invention will become apparent from the following detailed description taken in conjunction with the accompanying figures showing illustrative embodiments of the present invention, in which:

FIG. 7 is a third exemplary application scenario in the multi-transceiver system with two individually operated transceiver modules for measuring timing offsets between an RF signal forwarded via an antenna loop leading from the Tx signal processing chain and Tx/Rx antenna of a first transceiver module over the Tx/Rx antenna to the Tx signal processing chain of a second transceiver module and coupled out to the Rx signal processing chain of the second transceiver module and the same RF signal looped back via a local Tx-to-Rx feedback loop of the second transceiver module as well as between the RF signal forwarded via an antenna loop leading from the Tx signal processing chain and Tx/Rx antenna of the second transceiver module over the Tx/Rx antenna to the Tx signal processing chain of the individually operated first transceiver module and coupled out to the Rx signal processing chain of the first transceiver module and the same RF signal looped back via a local Tx-to-Rx feedback loop of the first transceiver module;

FIG. 8c is a diagram illustrating the exemplary principle of a downlink calibration of the smart antenna system which can be carried out when the exemplary system is activated/reset (field calibration) or during the run time of the system (run-time calibration).

Figure 1:
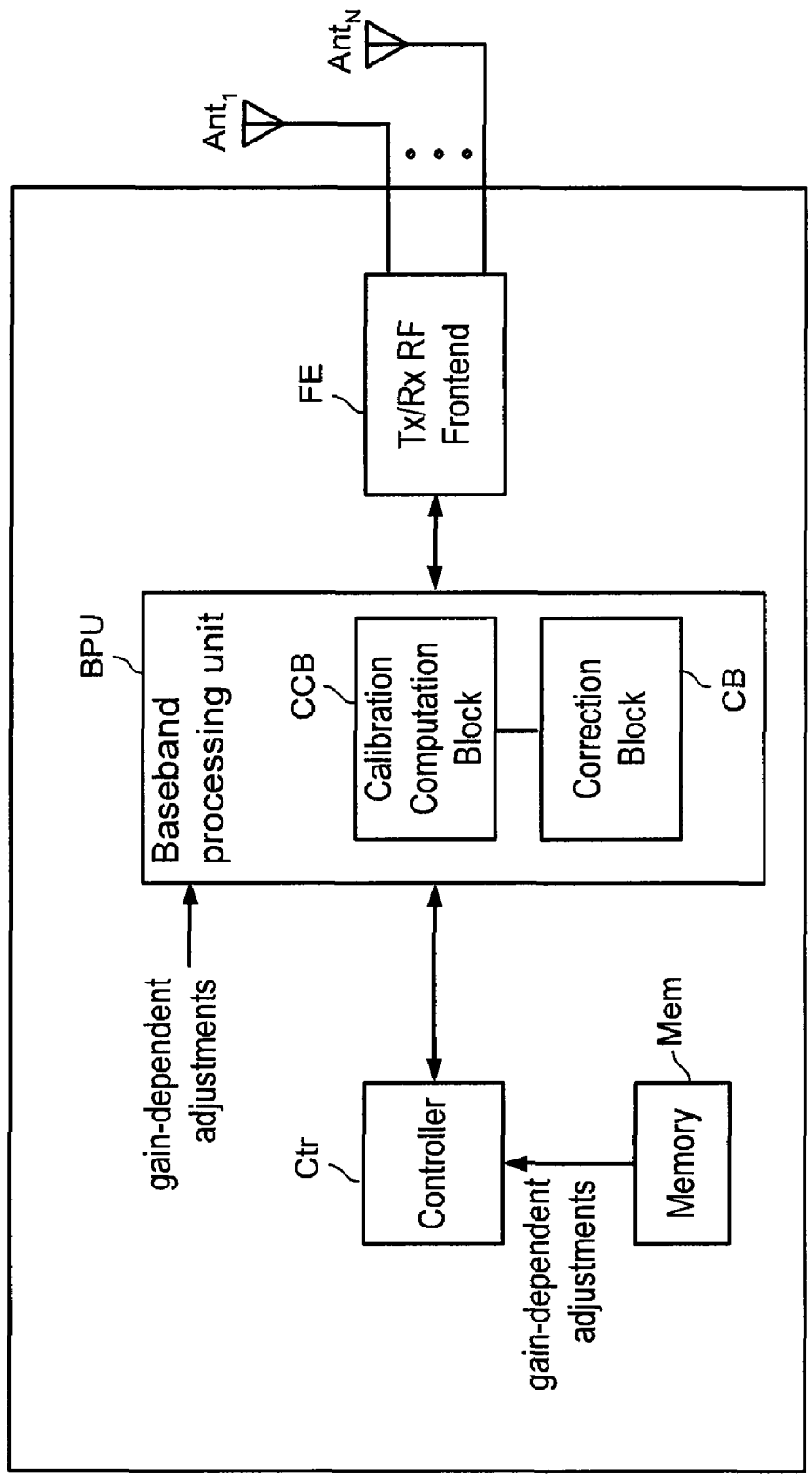
FIG. 1 is a schematic block diagram which shows an exemplary setup of a wireless spatial diversity transceiver comprising a calibration computation and correction block with gain offset and phase mismatch correction capability as known from the prior art, developed for use in a wireless multiple-input multiple-output (MIMO) spatial multiplexing system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention.

DETAILED DESCRIPTION OF EXEMPLARY EMBODIMENTS

Exemplary embodiments of a wireless dual-transceiver circuit according to the present invention are explained in more detail herein, thereby referring to the accompanying drawings.

For example, in FIG. 1, a block diagram of an exemplary setup of a wireless spatial diversity transceiver is illustrated for use in a wireless MIMO spatial multiplexing system and equipped with a calibration computation and correction block (CCB, CB) with gain offset and phase mismatch correction capability. Such exemplary capability is described in International Patent Publication WO 2004/025841. The illustrated transceiver device comprises a Tx/Rx RF front end FE coupled to an array of spatial diversity Tx/Rx antennas ($Ant_1$, $Ant_2$, ..., $Ant_N$), a baseband processing unit BPU (e.g. given by a common WCDMA/LTE system module) and a controller Ctr.

As discussed herein, the baseband processing unit BPU comprises a calibration computation block CCB which generates signals to be used for a calibration measurement procedure, makes the measurements and computes and stores the required correction values. The baseband processing unit BPU further comprises a correction block CB which is used for applying correction values to the baseband transmit signals or transmit weights, to the baseband receive signals or to both the baseband transmit signals and baseband receive signals so as to achieve a desired net correction.

The controller Ctr, which may, e.g., be realized as a microprocessor, is used for generating a signal coupled to the baseband processing unit BPU to initiate a self-calibration mode at initial power up of the device and/or periodically or occasionally thereafter to update the calibration parameters. Each device that relies on a symmetrical link with another device will self-calibrate in a similar manner. In case where variable gain amplifiers are used in the receivers and/or transmitters, calibration can take into account the changes in phase with respect to the applied gain setting of these components. One exemplary technique is to determine the phase versus gain setting relationship of receiver and transmitter components and store adjustments to gain-independent correction values in an integrated memory Mem, or alternatively, hard-code those adjustments in the digital logic of the baseband processing unit BPU as shown in FIG. 1.

These gain-dependent adjustments to the correction values may be generated once during the process of manufacturing, and then, during a run-time operation or mode of the device in the field, the adjustments are used according to current gain settings of the device. Alternatively, gain-dependent adjustments for the correction values may be computed in the field during a self-calibration mode or operation. The calibration logic is located in the baseband processing unit BPU because the baseband processor is typically implemented with digital logic gates of an ASIC that processes the baseband signals. For certain applications, or with the advancement of microprocessor capabilities for portable or embedded applications, the calibration logic may also be implemented in software stored or encoded in a processor readable memory medium and executed by the processor Ctr (which also executes the baseband processor logic). For relatively large group delay offsets (usually caused by baseband transmitter and/or receiver components), the phase mismatch among transceiver paths will vary within the bandwidth of the transmitted signal, thus requiring phase alignment that varies over frequency.

Figure 2:
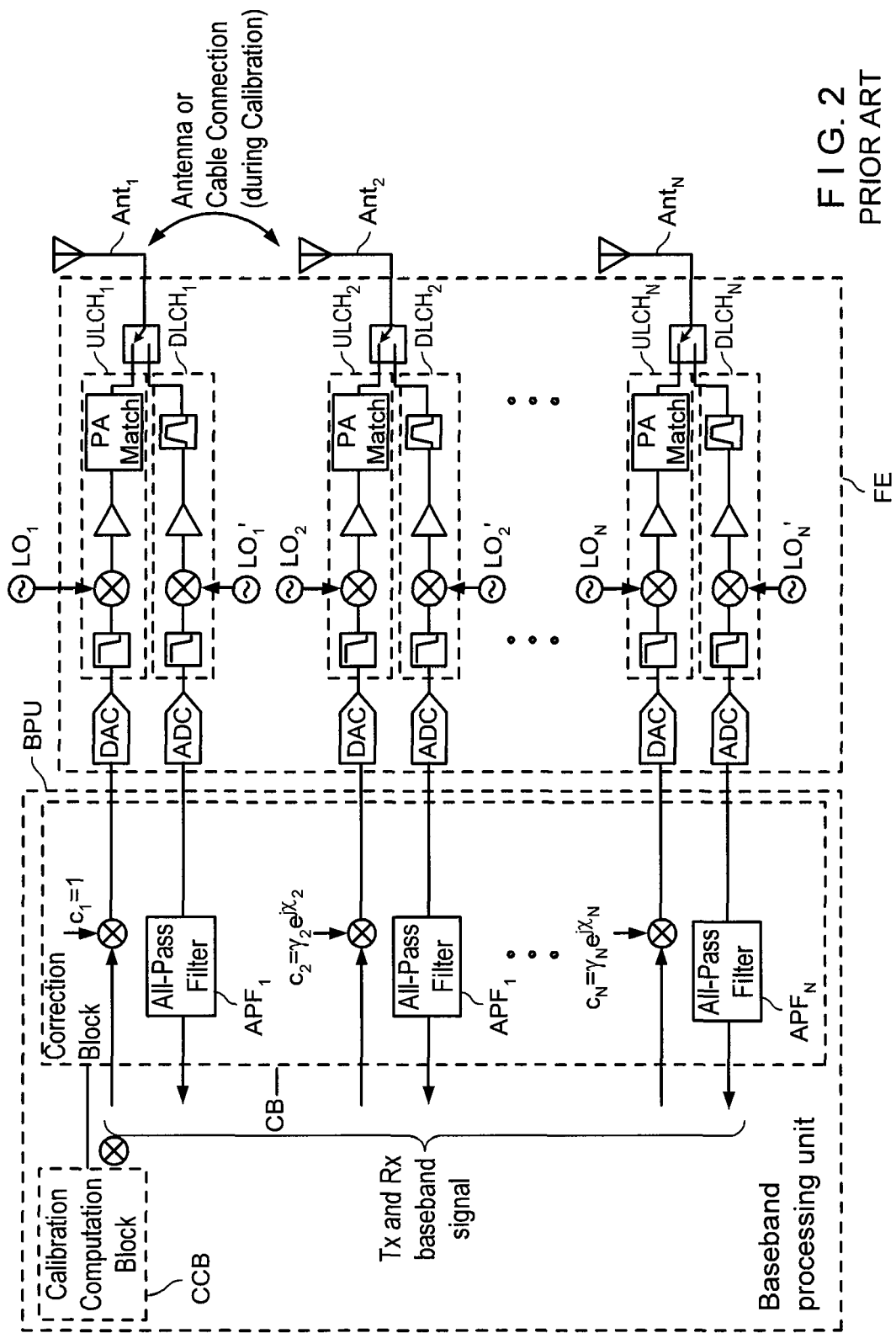
FIG. 2 is a more detailed block diagram showing the system components of the wireless transceiver device depicted in FIG. 1, exemplarily realized as a direct-conversion architecture.

FIG. 2 shows a more detailed block diagram of the system components of the wireless transceiver device depicted in FIG. 1, exemplarily realized as a direct-conversion architecture. This exemplary device can be used in the scope of single-carrier or multi-carrier modulation systems. For example, a more detailed view of baseband processing unit BPU comprising the calibration computation block CCB and the correction block CB is shown, whereas the correction block CB may comprise a number of all-pass filters $APF_1$, $APF_2, \ldots, APF_N$ and multipliers, the latter being employed for applying elements of a frequency-nonselective correction matrix $C=\text{diag } (c_1, \ldots, c_i, \ldots, c_N)$, where element $c_i:=\gamma_i \exp(j\chi_i)$ (for $i \in \{1, 2, \ldots, N\}$) is a correction value used for calibration purposes which is defined to compensate for phase offsets and amplitude offsets based on previously estimated gain correction values $\{\gamma_i\} i=1, \ldots, N$ and phase correction values $\{\chi_i\} i=1, \ldots, N$.

In addition to multiple Tx and Rx antennas, a wireless transceiver for use in a wireless MIMO communication system usually uses a separate RF chain per antenna element. In case of a base transceiver station realized as a multi-transceiver architecture which comprises a plurality of homodyne or zero-IF transceivers, a reception chain for the reception of an RF signal via an uplink channel $ULCH_1, ULCH_2, \ldots, ULCH_N$ typically comprises a band-pass filter stage, a low-noise amplifier (LNA), an image reject filter (not shown) and a down-conversion mixer followed by at least one IF amplifier (not shown), a low-pass filter, an A/D converter and a decoder (not shown), whereas a transmission chain for the transmission of a baseband signal to be transmitted via a downlink channel $DLCH_1, DLCH_2, \ldots, DLCH_N$, on the other hand, typically comprises an encoder (not shown), a D/A converter and a low-pass filter, followed by an up-conversion mixer, a power amplifier (PA) and a band-pass filtering stage (not shown). In some configurations, such as depicted in FIG. 2, it may be possible to share local oscillators required for providing a carrier frequency signal for up- and down-conversion between the particular chains. In addition, where operation is required over several frequency bands, some separate items may be required for each band (for example RF filters).

A MIMO system can significantly benefit from adaptation to the channel, and adaptivity is, of course, a feature of software defined radio (SDR) implementations. In addition, since they can potentially adapt to different air interfaces, they can readily adapt to relatively small changes within an air interface. This adaptivity can take various forms, providing various levels of benefit. Most of these schemes require knowledge of the channel at the transmitter side in order to facilitate an adaptation to its characteristics. This should be provided by feedback on a reverse channel from the receiver to the transmitter. Such MIMO transceiver architectures are based on a technology which requires that the particular wireless channels are relatively stationary. This is because the information to be wirelessly transmitted via a downlink channel can not generally be fed back for several frame periods of the reverse link, and if the channel changes significantly during that time, the information may be outdated and become useless. Furthermore, a stationary channel would likely require a lower overhead for the feedback of channel state information. Other schemes, however, can use information obtained by estimating the reverse link channel at the transmitter side, thus not requiring explicit channel state feedback, and some forms of adaptivity need to operate only at the receiver side, which also avoids providing feedback information.

Figure 3:
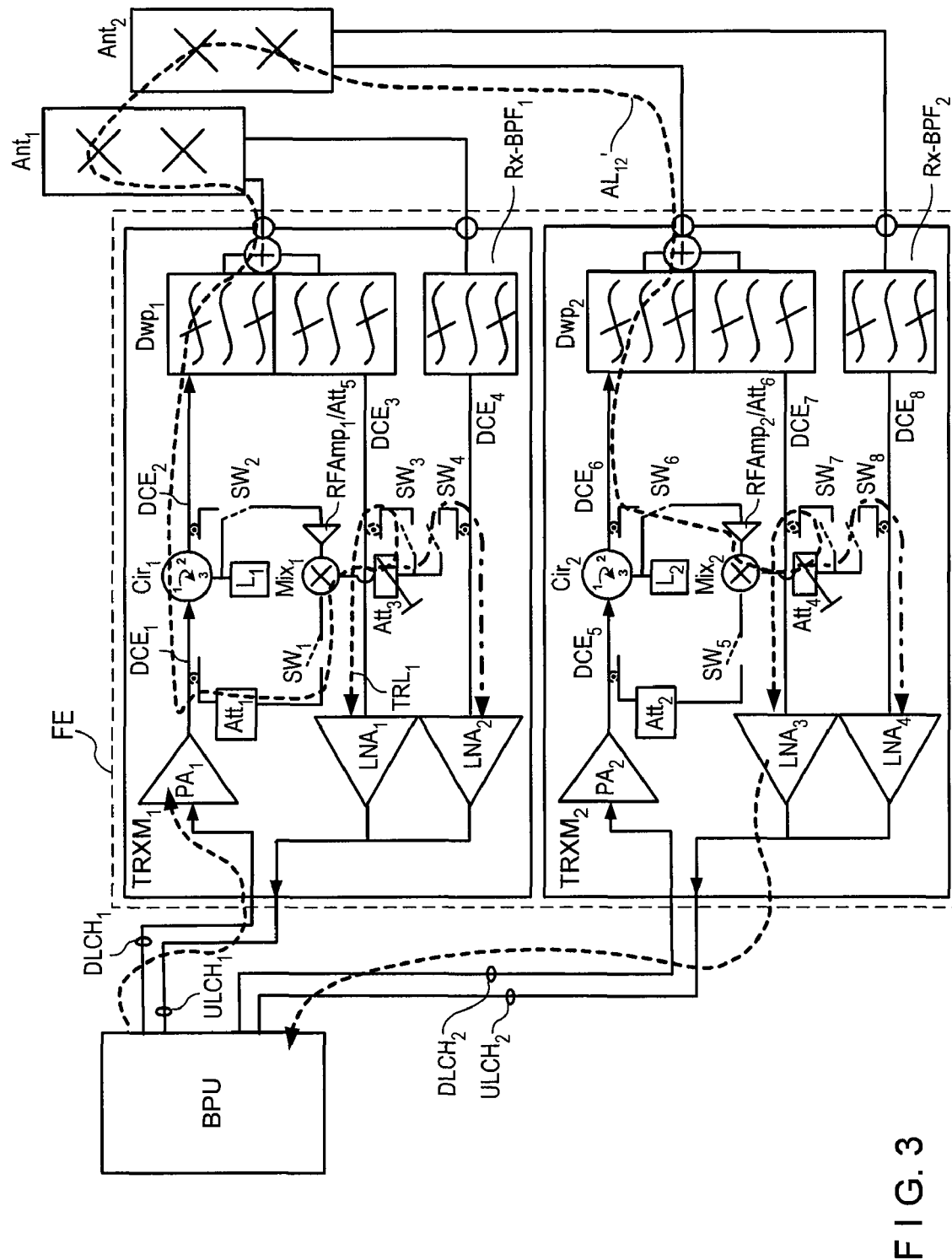
FIG. 3 is a block diagram of an exemplary wireless transceiver circuit including two individually operated transceiver modules according to a first exemplary embodiment of the present invention configured for use in a wireless MIMO spatial multiplexing system, whereas a second RF signal received via a second antenna connected to a reception chain of the second transceiver module is used for providing feedback information about a first RF signal transmitted from a first antenna connected to a transmission chain of the first transceiver module via a closed antenna loop.

A wireless dual-transceiver circuit according to the first exemplary embodiment of the present invention which is configured for use in a wireless MIMO spatial multiplexing system, whereas a second RF signal received via a second antenna connected to a reception chain of a second transceiver can be used for providing feedback information about a first RF signal transmitted from a first antenna connected to a transmission chain of a first transceiver via a closed antenna loop is shown in FIG. 3. As illustrated in FIG. 3, the dual-transceiver circuit comprises a first transceiver module $TRXM_1$ and an independently controllable second transceiver module $TRXM_2$, whereas each transceiver module can have its own spatial diversity Tx/Rx antenna ($Ant_1, Ant_2$) and may comprise an own downlink signal processing chain ($DLCH_1, DLCH_2$), as well as an own uplink signal processing chain ($ULCH_1, ULCH_2$).

Each of these uplink signal processing chains can comprise a main uplink signal processing chain and an auxiliary uplink signal processing chain, wherein each of said downlink and uplink signal processing chains is connected to a common baseband processing unit BPU. The first transceiver module $TRXM_1$ thereby comprises a second directional coupling element $DCE_1$, integrated into the downlink signal processing chain $DLCH_1$ of the first transceiver module, for coupling out a portion of an RF signal to be wirelessly transmitted by the Tx/Rx antenna $Ant_1$ of the first transceiver module $TRXM_1$ via the downlink signal processing chain $DLCH_1$ of this transceiver module. A switching element $SW_1$, serially connected to an output terminal of the second directional coupling element $DCE_1$ at which the coupled out RF transmit signal portion is supplied, serves for switchably feeding this signal portion to a third directional coupling element $DCE_3$ (or $DCE_4$, respectively) used for coupling in this signal portion to the uplink signal processing chain ($ULCH_1$) of the first transceiver module ($TRXM_1, TRXM_1'$) so as to feed it back to the common baseband processing unit (BPU).

FIG. 3 further shows that the downlink signal processing chain $DLCH_2$ of the second transceiver module $TRXM_2$ comprises a first directional coupling element $DCE_6$, integrated into the downlink signal processing chain $DLCH_2$ of the second transceiver module $TRXM_2$, which is used for coupling out a portion of an RF signal which has been received by the Tx/Rx antenna $Ant_2$ associated with the second transceiver module $TRXM_2$. According to an alternative exemplary embodiment, the directional coupler may be replaced by a signal taken from a third port (load port) of circulator $Cir_2$ or by a signal taken from a sample port of said circulator's load $L_2$. A first switching element $SW_6$, connected to an output terminal of the first directional coupling element $DCE_6$, at which the coupled out signal portion of the received RF signal is supplied, or alternatively to the third port (load port) of circulator $Cir_2$, serves for switchably feeding this received RF signal portion via the at least one uplink signal processing chain $ULCH_2$ of the second transceiver module $TRXM_2$ back to the aforementioned common baseband processing unit BPU.

In downlink direction of the first transceiver module $TRXM_1$, the second directional coupling element $DCE_1$ is pre-connected to a first circulator $Cir_1$ which serves for directing the signal flow of an RF signal to be transmitted via the downlink signal processing chain $DLCH_1$ of the first transceiver module $TRXM_1$ to the Tx/Rx antenna $Ant_1$ associated with this transceiver module. Furthermore, the downlink direction of the second transceiver module $TRXM_2$, on the other hand, the first directional coupling element $DCE_6$ is post-connected to a second circulator $Cir_2$ which serves for directing the signal flow of an RF signal to be transmitted via the downlink signal processing chain $DLCH_2$ of the second transceiver module $TRXM_2$ to the Tx/Rx antenna $Ant_2$ associated with this second transceiver module.

Figure 4A:
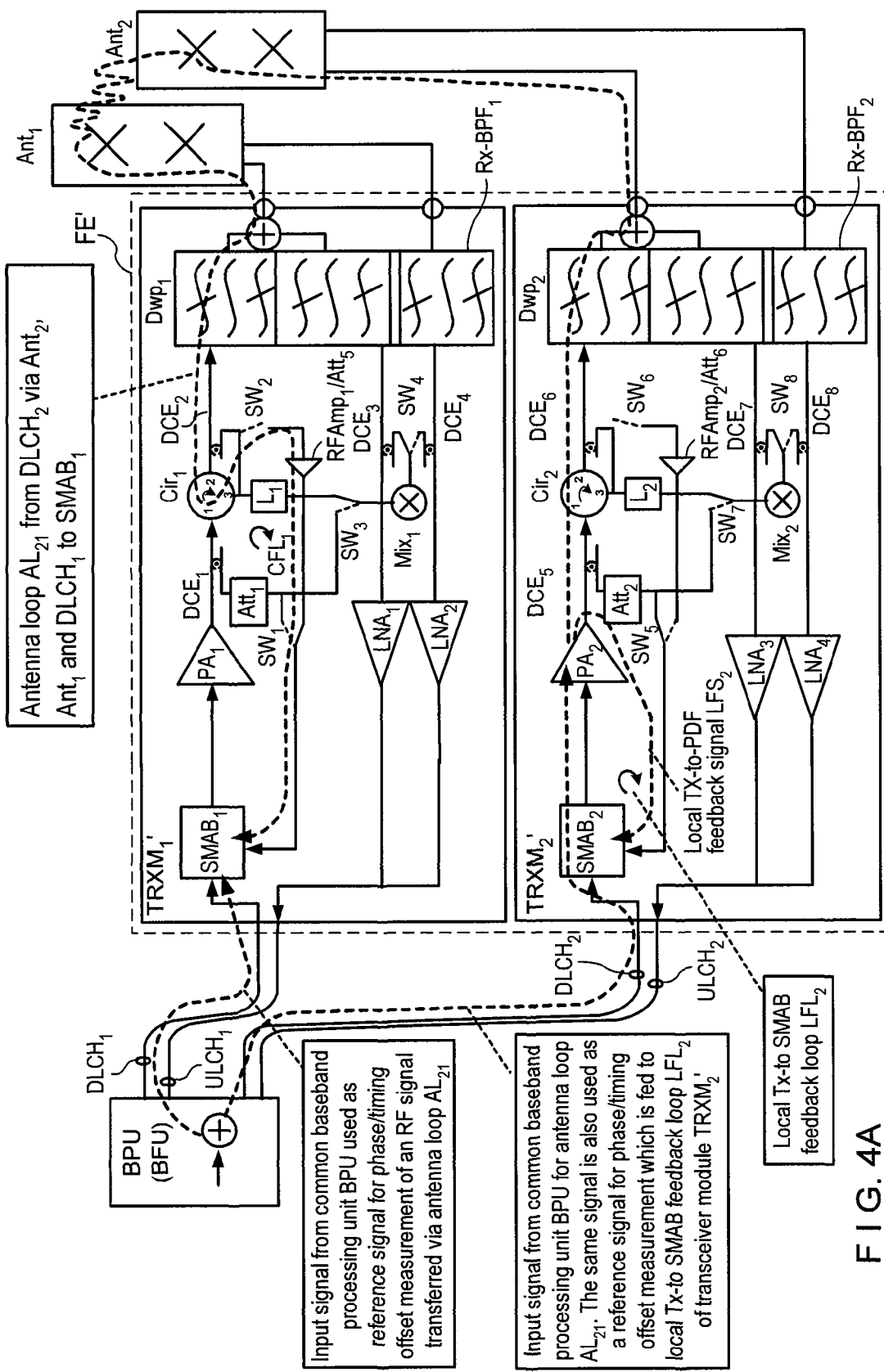
FIG. 4a is a block diagram of an exemplary wireless transceiver circuit according to a further aspect of the first exemplary embodiment, which shows the signal path of an RF signal to be transmitted by the Tx/Rx antenna of the second transceiver module, the RF signal being forwarded via an antenna loop leading from the Tx signal processing chain over the Tx/Rx antenna of the second transceiver module and the Tx/Rx antenna of the individually operated first transceiver module to a signal measurement and adjustment block integrated into the Tx signal processing chain of the first transceiver module, as well as the signal path of an RF signal looped back via a local Tx-to-SMAB (signal measurement and adjustment block) feedback loop located in the Tx signal processing chain of the second transceiver module.

A block diagram of a wireless dual-transceiver circuit according to a further aspect of the first exemplary embodiment is depicted in FIG. 4a. Contrary to the embodiment as shown in FIG. 3, the front end of the transceiver circuit in FIG. 4a is designed such that the first feedback chain is coupled to a first signal measurement and adjustment block $SMAB_1$ preconnected to at least one first power amplifier $PA_1$ in the downlink signal processing chain $DLCH_1$ of the first transceiver module (in the following referred to as $TRXM_1'$), wherein the first signal measurement and adjustment block $SAMB_1$ is configured for linearizing the input/output characteristic of said at least one first power amplifier $PA_1$. Furthermore, the first signal measurement and adjustment block $SAMB_1$ is specially adapted for performing a calibration based on a gain offset and/or phase mismatch measurement between the Tx baseband signal received from the common baseband processing unit and the RF signals received via antenna loop from transceiver module $TRXM_2'$.

FIG. 4a thereby shows the signal path of an RF signal to be transmitted by Tx/Rx antenna $Ant_2$ of the second transceiver module $TRXM_2'$. As can be taken from this schematic drawing, the RF signal is forwarded via an antenna loop $AL_{21}$ from the Tx signal processing chain $DLCH_2$ over the Tx/Rx antenna of the second transceiver module $TRXM_2'$ and circulator $Cir_1$ of the individually operated first transceiver module $TRXM_1'$, which circulator couples a part of this signal through a feedback path composed of switching element $SW_2$, RF amplifier and/or attenuator $RfAmp/Att_5$ and switch $SW_1$ to a signal measurement and adjustment block $SAMB_1$ integrated into the Tx signal processing chain $DLCH_1$ of the first transceiver module. Furthermore, FIG. 4a shows the signal path of an RF signal looped back via a local Tx-to-SMAB feedback loop $LFL_2$ located in the Tx signal processing chain $DLCH_2$ of the second transceiver module $TRXM_2'$. In addition to the depicted loops, it is possible to execute loops in a "mirrored" fashion, i.e. antenna loop $Ant_{12}$ from $TRXM_1$ to $SMAB_2$ and local feedback loop $LFL_1$ in transceiver module $TRXM_1$. By comparing the timing measurements from all four loop measurements, it is possible to calibrate the transmission timing differences between the Tx signal processing chains of the two transceiver modules.

Figure 4B:
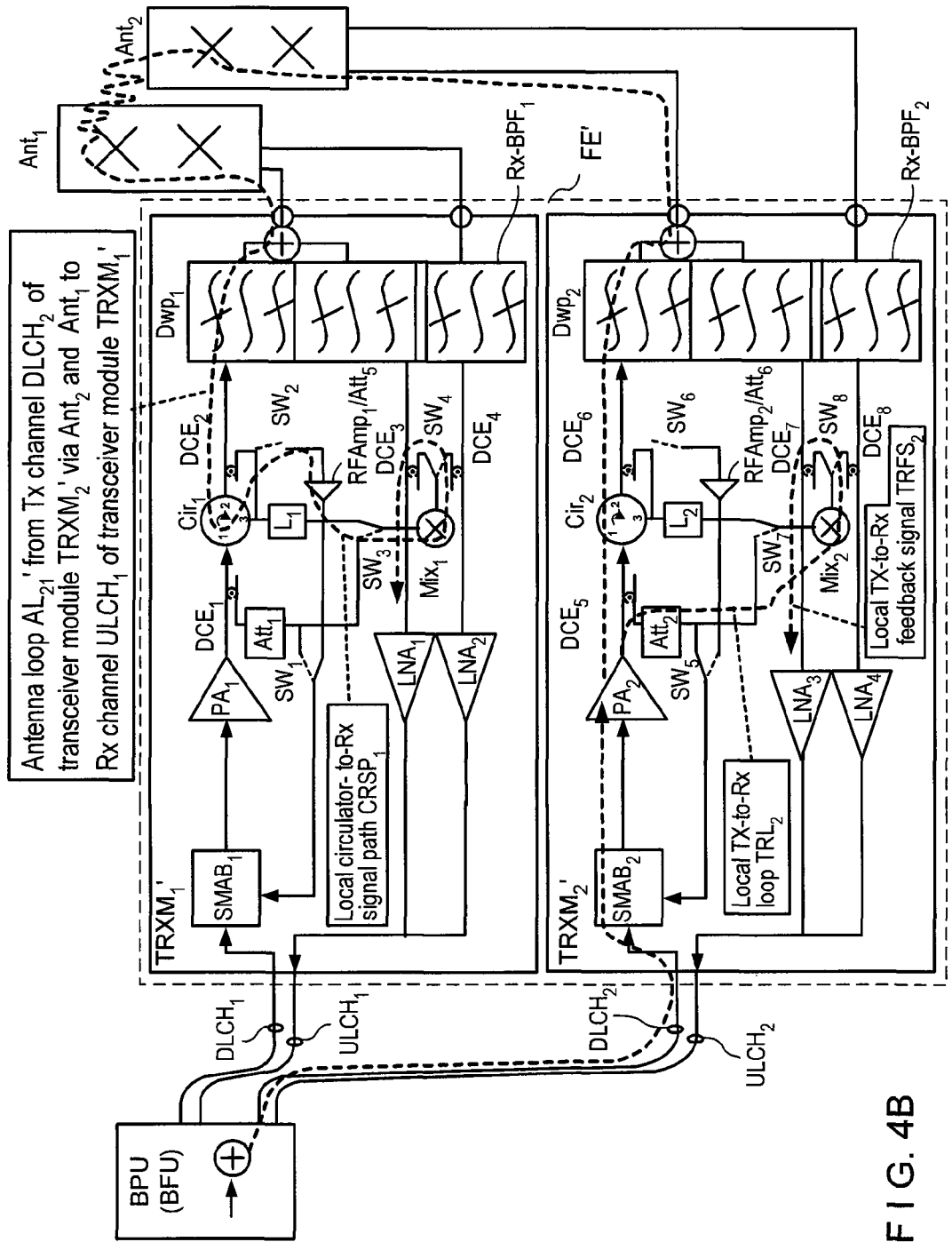
FIG. 4b is a block diagram of the exemplary wireless dual-transceiver circuit as described herein with reference to FIG. 4a, which shows the signal path of an RF signal to be transmitted by the Tx/Rx antenna of the second transceiver module, the RF signal being forwarded via an antenna loop leading from the Tx signal processing chain over the Tx/Rx antenna of the second transceiver module and the Tx/Rx antenna of the individually operated first transceiver module to the Rx signal processing chain of the first transceiver module, as well as the signal path of an RF signal looped back via a local Tx-to-Rx feedback loop of the second transceiver module.

Another type of antenna loop as well as another type of local feedback loop is illustrated in FIG. 4b, which shows a block diagram of a wireless dual-transceiver circuit as described herein with reference to FIG. 4a. For this exemplary illustration (i.e., FIG. 4b), a signal path of an RF signal to be transmitted by Tx/Rx antenna $Ant_2$ of the second transceiver module $TRXM_2'$ is shown, whereas the RF signal is forwarded via an antenna loop $AL_{21}'$ from the Tx signal processing chain $DLCH_2$ over Tx/Rx antenna $Ant_2$ of the second transceiver module and Tx/Rx antenna $Ant_1$ of the individually operated first transceiver module $TRXM_1'$ to the Rx signal processing chain $ULCH_1$ of the first transceiver module. In addition, FIG. 4b also shows the signal path of an RF signal looped back via a local Tx-to-Rx feedback loop $TRL_2$ of the second transceiver module $TRXM_2'$. In addition to the depicted loops, it is possible to execute loops in a "mirrored" fashion, e.g., antenna loop $Ant_{12}$ from $TRXM_1$ to $ULCH_2$ and local feedback loop to receiver path $TRL_1$ in transceiver module $TRXM_1$. By comparing the timing measurements from all four loop measurements, it is possible to calibrate the transmission timing differences between the Tx signal processing chains of the two transceiver modules.

Figure 5B:
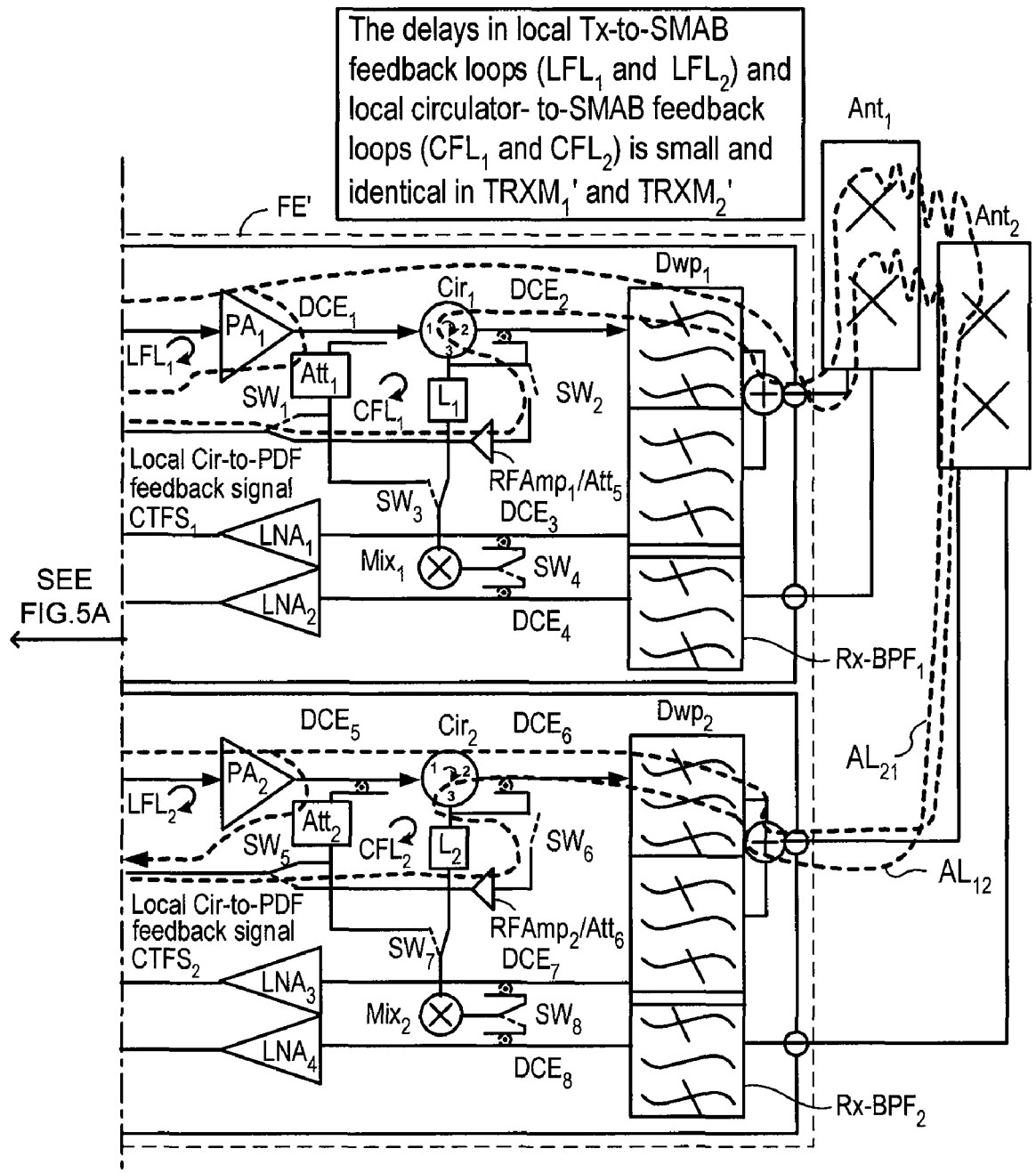
FIG. 5 is a first exemplary application scenario in a multi-transceiver system with two individually operated transceiver modules for measuring timing offsets between an RF signal forwarded via an antenna loop leading from the Tx signal processing chain and Tx/Rx antenna of a first transceiver module over the Tx/Rx antenna and Tx signal processing chain of a second transceiver module to a signal measurement and adjustment block integrated into the Tx signal processing chain of the second transceiver module and the same RF signal looped back via a local Tx-to-SMAB feedback loop located in the Tx signal processing chain of the second transceiver module as well as between the RF signal forwarded via a reverse antenna loop leading from the Tx signal processing chain and Tx/Rx antenna of the second transceiver module over the Tx/Rx antenna and Tx signal processing chain of the individually operated first transceiver module to a signal measurement and adjustment block integrated into the Tx signal processing chain of the first transceiver module and the same RF signal looped back via a local Tx-to-SMAB feedback loop located in the Tx signal processing chain of the first transceiver module.

FIG. 5 shows a diagram in which all four signal loop paths are provide which were illustrated in FIG. 4a. For example, the delay measurement uncertainty in the local Tx-to-SMAB feedback loop $LFL_1$ (or $LFL_2$, respectively) and the delay uncertainty (e.g., the reset-to-delay variation in digital parts) in the signal path segment between circulator $Cir_1$ (or $Cir_2$) and signal measurement and adjustment block $SAMB_1$ (or $SAMB_2$) of the corresponding transceiver module $TRXM_1'$ (or $TRXM_2'$) can be small, and group delay can be assumed as being identical in both transceivers. Furthermore, the antenna loop delay can be assumed as being identical in both directions.

Figure 6:
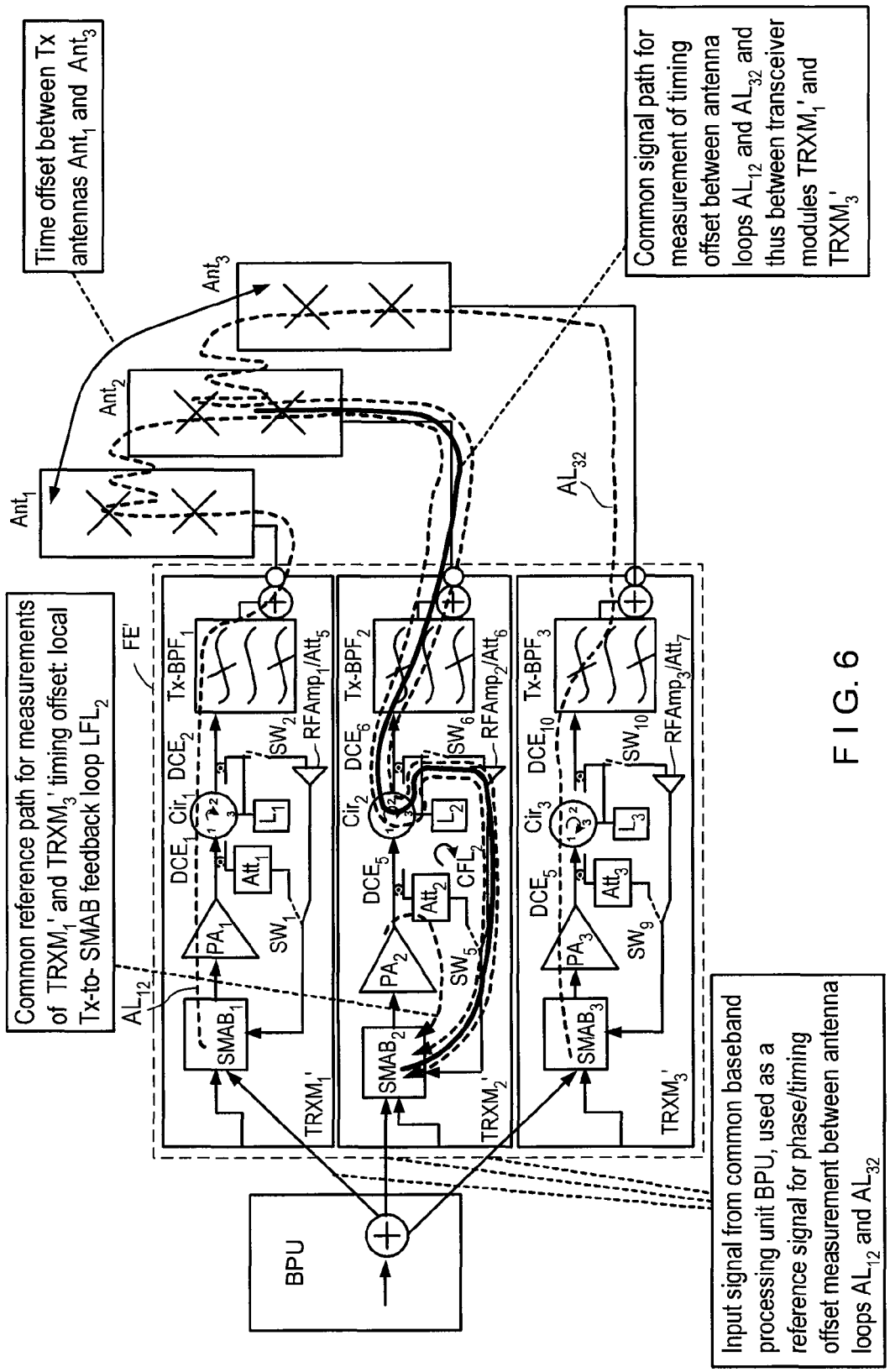
FIG. 6 is a second exemplary application scenario in the multi-transceiver system with three individually operated transceiver modules for measuring timing offsets between an RF signal forwarded via an antenna loop leading from the Tx signal processing chain and Tx/Rx antenna of a first transceiver module over the Tx/Rx antenna and Tx signal processing chain of a second transceiver module to a signal measurement and adjustment block integrated into the Tx signal processing chain of the second transceiver module and the same RF signal looped back via a local Tx-to-SMAB feedback loop located in the Tx signal processing chain of the second transceiver module as well as between the RF signal forwarded via another antenna loop leading from the Tx signal processing chain and Tx/Rx antenna of a third transceiver module over the Tx/Rx antenna and Tx signal processing chain of the second transceiver module to the signal measurement and adjustment block located in the Tx signal processing chain of the second transceiver module and the same RF signal looped back via the local Tx-to-SMAB feedback loop located in the Tx signal processing chain of the second transceiver module.

FIG. 6 shows a block diagram of a multi-transceiver system with three individually operated transceiver modules $TRXM_1'$, $TRXM_2'$ and $TRXM_3'$ to be used in a second application scenario for measuring amplitude, timing and phase offsets between an RF signal forwarded via an antenna loop $AL_{12}$ from the Tx signal processing chain $DLCH_1$ and Tx/Rx antenna $Ant_1$ of a first transceiver module $TRXM_1'$ over the Tx/Rx antenna $Ant_2$ and Tx signal processing chain $DLCH_2$ of a second transceiver module $TRXM_2'$ to a signal measurement and adjustment block $SMAB_2$ integrated into the Tx signal processing chain $DLCH_2$ of the second transceiver module $TRXM_2'$ and the Tx baseband signal received from common baseband processing unit. Furthermore, timing offsets are measured between the RF signal forwarded via another antenna loop $AL_{32}$ from the Tx signal processing chain $DLCH_3$ and Tx/Rx antenna $Ant_3$ of a third transceiver module $TRXM_3'$ over the Tx/Rx antenna $Ant_2$ and Tx signal processing chain $DLCH_2$ of the second transceiver module $TRXM_2'$ to the signal measurement and adjustment block $SMAB_2$ located in the Tx signal processing chain $DLCH_2$ of the second transceiver module $TRXM_2'$ and the Tx baseband signal received from the common baseband processing unit.

After performing the amplitude, phase and timing offset measurements for the antenna loops $AL_{12}$ and $AL_{32}$, the difference between the two measured amplitude, timing and phase offsets is calculated, wherein said difference represents the amplitude, timing and phase offset between the transmitted Tx signals from $DLCH_1$ and $DLCH_3$ at the antenna $Ant_2$. This measured and calculated amplitude, timing and phase offset can be used for production and field calibration of the multi-transceiver MIMO or smart antenna base system.

FIG. 7 shows a block diagram in which all four signal loop paths illustrated in FIG. 4b are shown. Initially, the timing offset between a signal transmission of the RF signal transferred via antenna loop $AL_{12}'$ and local Tx-to-Rx feedback loop $TRL_2$ is measured at the common baseband processing unit. Secondly, the timing offset between a signal transmitted via reverse antenna loop $AL_{21}'$ and local Tx-to-Rx feedback loop $TRL_1$ is measured in the common baseband processing unit BPU either by use of normal receiver detection algorithms or by using receiver detection algorithms with improved timing/phase measurement accuracy. In case of a smart antenna system with beamforming capability, this measurement may be carried out in an integrated beamforming unit BFU of said baseband processing unit.

This exemplary method also provides a relative delay or phase information regarding the Rx signal processing chains $ULCH_1$ and $ULCH_2$ of the two transceiver modules $TRXM_1'$ and $TRXM_2'$. In this connection, it should be noted that bandpass filters $Rx-BPF_1$ and $Rx-BPF_2$, which are located in the most upstream positions of these two Rx signal processing chains, are excluded from both antenna loops $AL_{21}'$ and $AL_{12}'$ and local Tx-to-Rx feedback loops $TRL_1$ and $TRL_2$.

After having carried out said measurement, the time difference between the two measured timing offsets is calculated, wherein said time difference represents the timing error between the RF signal fed forward to the Rx signal processing chain of the respective transceiver module via antenna loop and the same RF signal fed back to the Rx signal processing chain of said transceiver module via local Tx-to-Rx feedback loop. The delays in local Tx-to-Rx feedback loop $TRL_1$ and in the circulator-Rx signal path $CRSP_1$ of the first transceiver module $TRXM_1'$ (as well as the delays in local Tx-to-Rx feedback loop $TRL_2$ and in the circulator-Rx signal path $CRSP_2$ of the second transceiver module $TRXM_2'$) are relatively small and can be assumed as being identical in both transceiver modules, and the antenna loop delay is identical in direction from the first transceiver module $TRXM_1'$ to the second transceiver module $TRXM_2'$ and in the reverse direction.

Provided herein, two application scenarios of the exemplary embodiments of the present invention illustrating the exemplary principle of a calibration set-up for a smart antenna system in downlink calibration during system manufacture (factory calibration) and the principle of downlink calibration for a smart antenna system which is carried out when the system is activated/reset (field calibration) or during the run time of the system (run-time calibration) are described.

Figure 8A:
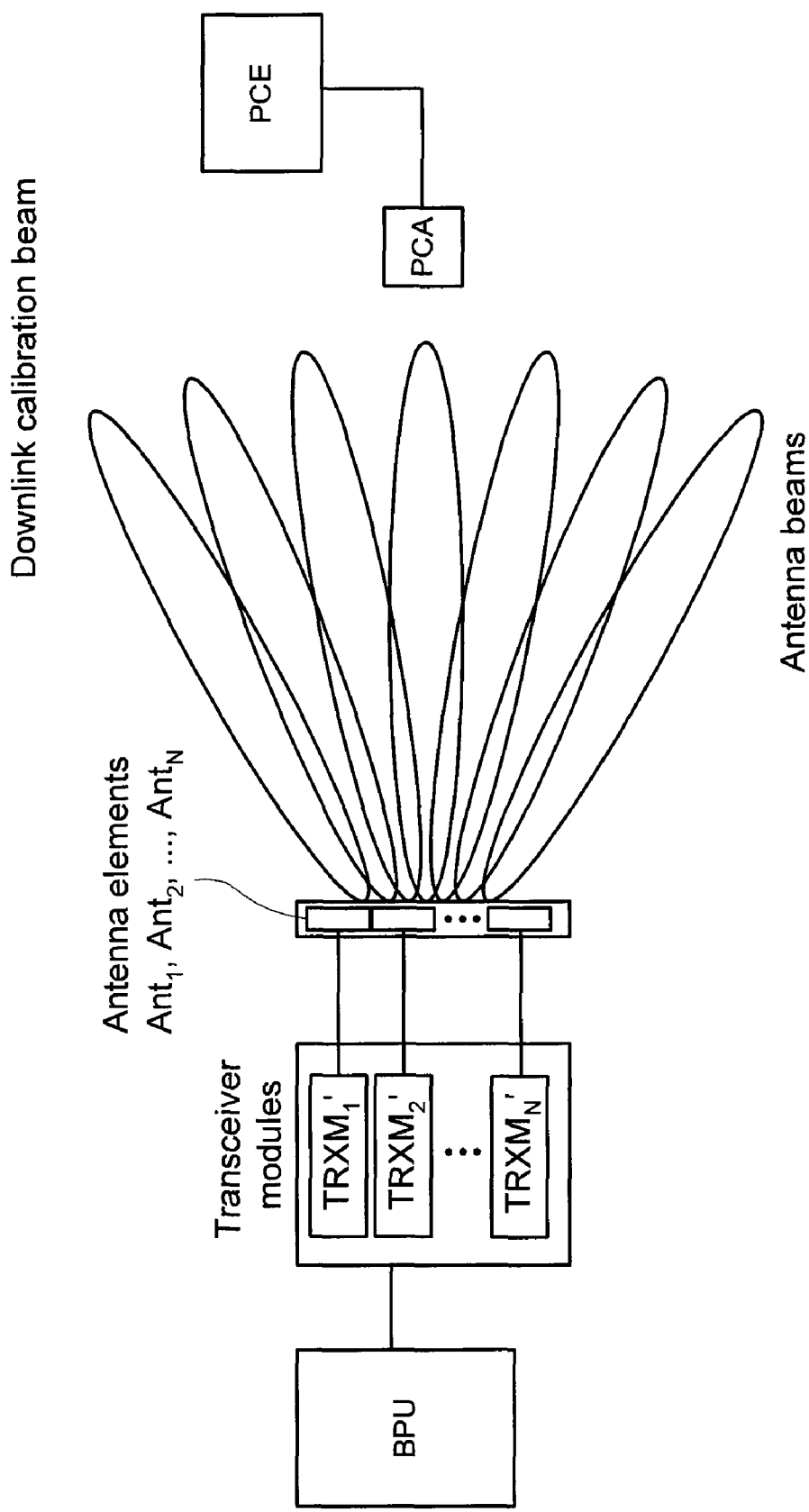
FIGS. 8a and 8b are diagrams illustrating an exemplary principle of a calibration set-up for a smart antenna system in downlink calibration during system manufacture (factory calibration) according to an exemplary embodiment of the present invention.
Figure 8B:
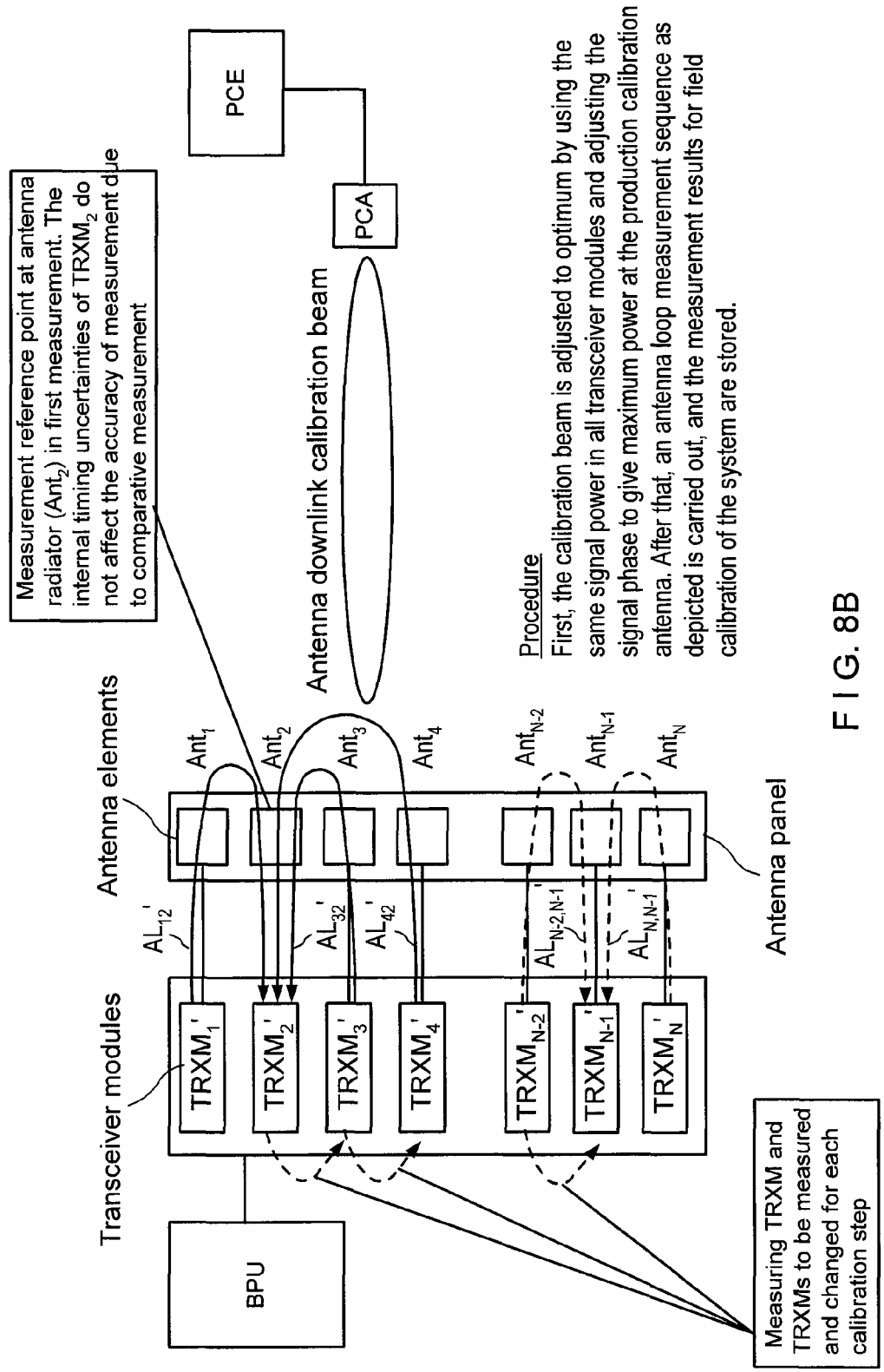

For example, in an exemplary factory calibration scenario as depicted in FIGS. 8a and 8b, a preferred downlink calibration beam is generated for example by using a measurement antenna (also referred to as production calibration antenna PCA) and RF power meter or production calibration equipment PCE to monitor the received RF power in the center axis of the beam. Transmitters are activated one by one at the same output power level and use the same or known different input signal, and the phase of each new transmitter is adjusted until maximum power is detected at the power meter. By this simple sequence the phase and timing of the transmitters is set ideal to produce an ideal beam pointing to wanted direction (e.g., a production calibration antenna).

As a next step, a sequence of antenna loop amplitude, timing and phase offset measurements is executed, where in each measurement the antenna loop from two transmit chains to a third transmit chain is activated. The looped transmit chains are selected in such a way that the transmitting and receiving antenna elements are situated close to each other in the antenna panel. The amplitude, timing and phase offset is measured and stored to non-volatile media in the smart antenna system. In the sequence of measurements, the received (measured) RF signal is stepped through all transmit chains, and the transmit chains are also changed as per figure. Furthermore, multiple measurements from different transmit chains to one stationary measuring chain can be used.

It is also possible to alter the direction of the calibration beam and store multiple calibration value sets by use of multiple calibration antennas or antenna positions and by repeating the calibration routine for each direction separately.

In a field calibration scenario as depicted in FIG. 8c, each time when the smart antenna system is activated in the field or when parts of the system are recovered from a reset, the transmit chains may be affected by reset-to-reset variable timing uncertainties. In addition, if the transmit chains are not integrated directly to antenna panels but antenna cables are used instead, there may be a risk of different antenna cables being used in the field than in the factory calibration causing uncertainties or changes in the latency between any transmit chain and corresponding antenna element. Therefore, the smart antenna system must be field-calibrated each time when the system is restarted.

In the exemplary field calibration, the transmit chains are activated at same power level. After the exemplary system has warmed up and temperatures have settled, the calibration is started. The calibration sequence may step through the measurements in same order as in the factory (production) calibration. In field calibration, the first amplitude, timing and phase offset measurement is executed and the measured offset is compared to factory calibration value. If measurement differs, then the timing/phase of the other transmit chain is adjusted and measurement is repeated. This adjustment and re-measurement is continued until the measurement is as close as possible equal to the factory calibration value. Thereafter, the next pair of transmitting transceivers is selected in such a way that the first transmitter chain is one already adjusted and the other one is not field-calibrated yet. The amplitude, timing and phase offset adjustment is made to the non-calibrated transmit chain. The calibration sequence is complete when all transmit chains have been measured and adjusted at least for once.

Different sequences may be used, e.g., stepping the field calibration sequence through once and then back in reverse route. It is also possible to perform extra measurements in the production calibration between more distant transmit chain pairs and check the field calibration by measuring the same transmit chain pairs and comparing the amplitude, timing and phase offset measurements.

It may be possible to perform parallel calibration measurements and calibration if first two distant antenna elements are first calibrated and then using these are reference chains, the neighboring chains of these are calibrated simultaneously.

Field calibration measurement data may be stored to non-volatile memories together with e.g. transceiver temperature measurement, Tx output power and other relevant data to learn the relationship between these parameters and the changes in the amplitude, timing and phase behavior of the smart antenna system. By collecting this information, the system may learn to do predictive phase adjustments, i.e. blind adjustments without running the complete field calibration routine so often. This would be beneficial specially because during the field calibration procedure the capacity of the system will decrease due to specific calibrations signals and/or possible reservation of specific codes, timeslots or resource blocks depending on the radio standard.

EXEMPLARY REFERENCE SIGNS AND CORRESPONDING SYMBOLS SHOWN IN FIGURES

ADC analog-to-digital converter $AL_{12}$ antenna loop which forwards an RF signal to be wirelessly transmitted by said first transceiver module $TRXM_1'$ from Tx signal processing chain $DLCH_1$ of the first transceiver module $TRXM_1'$ via antenna $Ant_1$ of said first transceiver module $TRXM_1'$, antenna $Ant_2$ of a separate second transceiver module $TRXM_2'$ and a third port of an integrated circulator $Cir_2$ to a signal measurement and adjustment block $SMAB_2$ integrated in the Tx signal processing chain $DLCH_2$ of said second transceiver module $TRXM_2'$ $AL_{12}'$ antenna loop which forwards an RF signal to be wirelessly transmitted by said first transceiver module $TRXM_1'$ from Tx signal processing chain $DLCH_1$ of the first transceiver module $TRXM_1'$ via antenna $Ant_1$ of said first transceiver module $TRXM_1'$, antenna $Ant_2$ of said second transceiver module $TRXM_2'$ and a third port of an integrated circulator $Cir_2$ to the Rx signal processing chain $ULCH_2$ of said second transceiver module $TRXM_2'$ $AL_{21}$ antenna loop which forwards an RF signal to be wirelessly transmitted by said second transceiver module $TRXM_2'$ from Tx signal processing chain $DLCH_2$ of the second transceiver module $TRXM_2'$ via antenna $Ant_2$ of said second transceiver module $TRXM_2'$, antenna $Ant_1$ of said first transceiver module $TRXM_1'$ and a third port of an integrated circulator $Cir_1$ to a signal measurement and adjustment block $SMAB_1$ integrated in the Tx signal processing chain $DLCH_1$ of said first transceiver module $TRXM_1'$ $AL_{21}'$ antenna loop which forwards an RF signal to be wirelessly transmitted by said second transceiver module $TRXM_2'$ from Tx signal processing chain $DLCH_2$ of the second transceiver module $TRXM_2'$ via antenna $Ant_2$ of said second transceiver module TRXM$_2$', antenna Ant$_1$ of said first transceiver module TRXM$_1$' and a third port of an integrated circulator Cir$_1$ to the Rx signal processing chain ULCH$_1$ of said first transceiver module TRXM$_1$'

AL$_{ij}$, AL$_{ij}$' other antenna lops between transceiver modules TRXM$_i$' and TRXM$_j$' (with i,j∈{1, 2, ..., N}, i≠j)

Ant$_1$, ..., Ant$_N$ Tx/Rx antennas

APF$_1$, ..., APF$_N$ all-pass filters

Att$_1$, ..., Att$_N$ attenuators

BFU beamforming unit

BPF band-pass filter

BPU baseband processing unit

CB correction block

CCB calibration computation block

CFL$_1$, CFL$_2$ local circulator-to-SMAB feedback loops of in the TX chains DLCH$_1$ and DLCH$_2$ of said first (TRXM$_1$) or second transceiver module (TRXM$_2$), respectively Cir$_1$, ..., Cir$_3$ circulators CTFS$_1$, CTFS$_2$ local circulator (Cir)-to-SMAB feedback signal looped back via CFL$_1$ or CFL$_2$, respectively CRSP$_1$, CRSP$_2$ local circulator-to-Rx signal path of transceiver TRXM$_1$' or TRXM$_2$'

Ctr controller

DAC digital-to-analog converter

DCE$_1$, ..., DCE$_{11}$ directional coupling elements

DLCH$_1$, DLCH$_2$, ..., DLCH$_N$ Tx signal processing chain (=downlink chain in case of base transceiver station)

Dup$_1$, Dup$_2$ duplexer filters

FE, FE' Tx/Rx RF front end

L$_1$, ..., L$_3$ loads

LFL$_1$, LFL$_2$ local Tx-to-SMAB feedback loops located in the Tx signal processing chains DLCH$_1$ and DLCH$_2$ of said first (TRXM$_1$) or second transceiver module (TRXM$_2$), respectively LFS$_1$, LFS$_2$ local Tx-to-PDF feedback signal looped back via LFL$_1$ or LFL$_2$, respectively LNA$_1$, ..., LNA$_5$ low-noise amplifiers in the Rx signal processing chains of transceiver modules TRXM$_1$ and TRXM$_2$ or transceiver modules TRXM$_1$', ..., TRXM$_3$', respectively LO$_1$, LO$_1$', ..., LO$_3$, LO$_3$' local oscillators LPF low-pass filter Mem memory Mix$_1$ up-/down-conversion mixer for converting a Tx band signal to be wirelessly transmitted by transceiver module TRXM$_1$ (or TRXM$_1$', respectively) to the corresponding Rx band of said transceiver module Mix$_2$ up-/down-conversion mixer for converting a Tx band signal to be wirelessly transmitted by transceiver module TRXM$_2$ (or TRXM$_2$', respectively) to the corresponding Rx band of said transceiver module PA$_1$, ..., PA$_3$ power amplifiers in the Tx signal processing chains of transceiver modules TRXM$_1$ and TRXM$_2$ or transceiver modules TRXM$_1$', ..., TRXM$_3$', respectively PCA production calibration antenna PCE production calibration equipment RfAmp$_1$/Att$_5$, ..., RfAmp$_3$/Att$_7$ amplifiers/attenuators in the feedback chains of circulator feedback loops CFL$_1$ and CFL$_2$ Rx-BPF$_1$, ..., Rx-BPF$_3$ bandpass filters at the RF outputs of Rx signal processing chains Nos. 1, 2 and 3

SMAB$_1$, ..., SMAB$_3$ signal measurement and adjustment blocks (e.g. given by predistortion filters with a specific signal measurement and adjustment capability), located in the Tx signal processing chains of transceiver modules TRXM$_1$', ..., TRXM$_3$'

SW$_1$, ..., SW$_{11}$ switching elements

TRFS$_1$, TRFS$_2$ local Tx-to-Rx feedback signal looped back via TRL$_1$ or TRL$_2$, respectively TRL$_1$, TRL$_2$ local Tx-to-Rx feedback loop of transceiver TRXM$_1$' or TRXM$_2$'

TRXM$_1$, TRXM$_2$, TRXM$_1$', ..., TRXM$_N$' individually operated transceiver modules Tx-BPF$_1$, ..., Tx-BPF$_3$ bandpass filters at the RF outputs of Tx signal processing chains Nos. 1, 2 and 3

ULCH$_1$, ULCH$_2$, ..., ULCH$_N$ Rx signal processing chain (=uplink chain in case of base transceiver station)

Exemplary Applications of Exemplary Embodiments

The exemplary front end can advantageously be applied for calibration and antenna monitoring in the field of multi-transceiver architectures with spatial antenna diversity for use in a MIMO spatial multiplexing system according to the WCDMA/TDD, GSM, WiMAX or LTE standard. As an alternative, the exemplary embodiments of the present invention can be applied in the scope of a calibration procedure for an adaptive beamforming application which provides for gain offset and/or phase mismatch correction. Furthermore, it is also possible to use the exemplary embodiments of the present invention for an advanced signal quality monitoring to verify that the signal paths included in the respective antenna loops meet prescribed system requirements.

While the present invention has been illustrated and described in detail in the drawings and in the foregoing description, such illustration and description are to be considered illustrative or exemplary and not restrictive, which means that the invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Furthermore, any reference signs in the claims should not be construed as limiting the scope of the invention. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. A front end arrangement of a multi-transceiver system architecture for use in a wireless multiple-input multiple-output spatial multiplexing system, comprising:

a first transceiver module and an independently controllable second transceiver module, each of the first and second transceiver modules comprising (i) a respective transceive antenna, (ii) a respective transmit signal processing chain, and (iii) at least one respective receive signal processing chain, each of the signal processing chains being connected to a common baseband processing unit, the baseband processing unit generating the same baseband signal to the transmit signal processing chains; and a built-in feedback arrangement which facilitates at least one of:

a measurement of amplitude, timing and phase offsets by a signal measurement and adjustment block integrated into a digital predistortion system in the transmit signal processing chain of the second transceiver module, the offsets being measured between an a radio-frequency (RF) signal generated in the first transceiver module, the signal being coupled via an antenna loop from the transceive antenna of the first transceiver module to the transceive antenna of the second transceiver module, and forwarded to the signal measurement and adjustment block, and the corresponding transmit baseband signal of the RF signal, the transmit baseband signal being generated by the common baseband processing unit and provided to the signal measurement and adjustment block of the second transceiver module, or a measurement of the amplitude, timing and phase offsets by the signal measurement and adjustment block integrated into the digital predistortion system in the transmit signal processing chain of the second transceiver module, the offsets being measured between the RF signal generated in the second transceiver module, the signal being coupled via a reverse antenna loop from transceive antenna of the second transceiver module to the transceive antenna of the first transceiver module, and forwarded to the signal measurement and adjustment block of the first transceiver module, and the transmit baseband signal received from the common baseband unit and provided to the signal measurement and adjustment block of the first transceiver module, wherein the respective integrated signal measurement and adjustment blocks of the digital predistortion systems in the transmit signal processing chains of the first and second transceiver modules are configured to operate at a higher sampling rate and dynamic range than available for the common baseband processing unit.

2. The front end arrangement according to claim 1, wherein each of the first and second transceiver modules is accommodated within a same physical RF module or a same RF unit.

3. The front end arrangement according to claim 1, wherein each of the first and second transceiver modules is accommodated within a different RF module or a different RF unit of the multi-transceiver system architecture.

4. The front end arrangement according to claim 1, wherein the common baseband processing unit is implemented by a number of separate baseband processing units that communicate with each other.

5. The front end arrangement according to claim 1, wherein the common baseband processing unit is implemented by a single baseband processing unit.

6. The front end arrangement according to claim 1,
wherein the at least one transmit signal processing chain of the second transceiver module comprises
a first directional coupling element integrated into the at least one transmit signal processing chain of the second transceiver module for coupling out a portion of the RF signal which has been received by the transceive antenna associated with the second transceiver module,
a first switching element connected to an output terminal of the first directional coupling element at which the coupled out signal portion of the received RF signal is supplied, for switchably feeding the received RF signal portion to the signal measurement and adjustment block or to the at least one receive signal processing chain of the second transceiver module back to the common baseband processing unit, and
for a duplex system, (i) an up-/down-conversion mixer configured to convert the received signal portion to be supplied to the baseband processing chain to the receive band or (ii) a controlling mechanism for adjusting the operating frequency of the RF signal forwarded by the receive signal processing chain of the second transceiver module to the operating frequency of the used transmit channel, and wherein the at least one transmit signal processing chain of the first transceiver module comprises logically equivalent components.

7. The front end arrangement according to claim 1,
wherein the at least one transmit signal processing chain of the second transceiver module comprises:
a circulator having a load port being integrated into the at least one transmit signal processing chain of the second transceiver module for coupling out a portion of the RF signal which has been received by the transceive antenna associated with the second transceiver module,
a first switching element connected to the load port of the circulator at which the coupled out signal portion of the received RF signal is supplied, for switchably feeding the received RF signal portion to the signal measurement and adjustment block or via the at least one receive signal processing chain of the second transceiver module back to the common baseband processing unit, and
for a duplex system, (i) an up-/down-conversion mixer for converting the received signal portion to be supplied to the baseband processing chain to the receive band or (ii) a controlling mechanism for adjusting the operating frequency of the RF signal forwarded by the receive signal processing chain of the second transceiver module to the operating frequency of a used transmit channel, and wherein the at least one transmit signal processing chain of the first transceiver module comprises logically equivalent components.

8. The front end arrangement according to claim 1,
wherein the first transceiver module comprises
a second directional coupling element integrated into the at least one transmit signal processing chain of the first transceiver module for coupling out a portion of the RF signal to be wirelessly transmitted by the transceive antenna of the first transceiver module via the at least one transmit signal processing chain of the first transceiver module,
at least one second switching element connected to an output terminal of the second directional coupling element at which the coupled out RF transmit signal portion is supplied, for switchably feeding this signal portion to a third directional coupling element used for coupling in the signal portion to the at least one receive signal processing chain of the first transceiver module so as to feed it back to the common baseband processing unit, and
for a duplex system, (i) an up-/down-conversion mixer for converting the received signal portion to be supplied to the baseband processing chain to the receive band or (ii) a controlling mechanism for adjusting the operating frequency of an RF signal forwarded by the receive signal processing chain of the first transceiver module to the operating frequency of the used transmit channel, and wherein the second transceiver module comprises logically equivalent components.

9. The front end arrangement according to claim 8,
wherein, in a transmission direction of the first transceiver module, the second directional coupling element is pre-connected to a first circulator which directs the signal flow of the RF signal to be transmitted via the transmit signal processing chain of the first transceiver module to the transceive antenna associated with this transceiver module, and wherein the second transceiver module uses a same order in a connectivity between logically equivalent elements.

10. The front end arrangement according to claim 9, wherein the first transceiver module (TRXM$_1$, TRXM$_1$') comprises at least one attenuation element having an adjustable attenuation factor for attenuating the signal amplitude of the coupled out RF transmit signal portion, integrated into a first feedback chain for feeding a portion of the RF signal to be transmitted by the transceive antenna associated with the first transceiver module back to the signal measurement and an adjustment block or to the at least one respective receive signal processing chain of the first transceiver module, and wherein the second transceiver module comprises logically equivalent elements.

11. The front end arrangement according to claim 8, wherein, in a transmission direction of the second transceiver module, the first directional coupling element is post-connected to a second circulator which serves for directing the signal flow of the RF signal to be transmitted via the Tx signal processing chain of the second transceiver module to the transceive antenna associated with this second transceiver module, and wherein the first transceiver module uses a same order in a connectivity between logically equivalent elements.

12. The front end arrangement according to claim 11, wherein the second transceiver module comprises at least one of (i) at least one amplification element or (ii) an attenuator element for weighting the signal amplitude of the coupled in RF receive signal portion with an adjustable gain factor, integrated into a second feedback chain for feeding a portion of the RF signal received from the transceive antenna associated with the second transceiver module back to the signal measurement and adjustment block or to the at least one respective receive signal processing chain of the second transceiver module, and wherein the first transceiver module comprises logically equivalent elements.

13. The method according to claim 1, wherein the operation is performed for use in the wireless multiple-input multiple-output spatial multiplexing system or a smart antenna system according to at least one of GSM, UMTS, WiMAX or LTE standards.

14. A multi-transceiver system architecture arrangement for use in a wireless multiple-input multiple-output (MIMO) spatial multiplexing system, comprising a first transceiver module and one or more independently controllable second, third and optional further transceiver modules, each of the transceiver modules having a respective transceive antenna and comprising at least one respective transmit signal processing chain with each of these signal processing chains being connected to a common baseband processing unit, the baseband processing unit generating a same baseband signal and feeding it to each transmit signal processing chain, a built-in feedback mechanism configured to:

measure amplitude, timing and phase offsets by a signal measurement and adjustment block integrated into a digital predistortion system in the transmit signal processing chain of the second transceiver module, the offsets being measured between an a radio-frequency (RF) signal generated in the first transceiver module, the signal being coupled via an antenna loop from the transceive antenna of the first transceiver module to the transceive antenna of the second transceiver module, and forwarded to the signal measurement and adjustment block, and the corresponding transmit baseband signal of the RF signal, the transmit baseband signal being generated by the common baseband processing unit and provided to the signal measurement and adjustment block of the second transceiver module, or measure further amplitude, timing and phase offsets by the signal measurement and adjustment block between at least one further RF signal generated in the third transceiver module or any one of the optional further transceiver modules, the signal being coupled via a reverse antenna loop from the transceive antenna of the third transceiver module or any one from the optional further transceiver modules to the transceive antenna of the second transceiver module and forwarded to the signal measurement and adjustment block, and the transmit baseband signal, compare the measurements with each other, and interpret final amplitude, timing and phase differences between each pair of these measurements as the amplitude, timing and phase difference between the first RF signal and the at least one further RF signal at the transceive antenna of the second transceiver module, wherein the integrated signal measurement and adjustment block of the digital predistortion system in the transmit signal processing chain of the second transceiver module is configured to operated at a higher sampling rate and dynamic range than available for the common baseband processing unit.

15. A method for measuring amplitude, timing and phase offsets in a multi-transceiver system for use in a wireless multiple-input multiple-output spatial multiplexing system, the multi-transceiver system comprising at least two individually operated transceiver modules, each transceiver module comprising at least one respective transceive antenna and at least one respective transmit signal processing chain with each of these signal processing chains being connected to a common baseband processing unit, the baseband processing unit generating a same baseband signal to both transmit signal processing chains, the method comprising:

performing at least one of:

measuring amplitude, timing and phase offsets are measured by a signal measurement and adjustment block integrated into a digital predistortion system in the transmit signal processing chain of the second transceiver module between the RF signal generated in the first transceiver module, the signal being coupled via an antenna loop from the transceive antenna of the first transceiver module to the transceive antenna of the second transceiver module, and forwarded to the signal measurement and adjustment block, and the Tx baseband signal generated by the common baseband processing unit and fed to the signal measurement and adjustment block located in the transmit signal processing chain of the second transceiver module, or measuring amplitude, timing and phase offsets are measured by the signal measurement and adjustment block integrated into the digital predistortion system in the transmit signal processing chain of the first transceiver module between an RF signal generated in the second transceiver module, which signal is first coupled via a reverse antenna loop from transceive antenna of the second transceiver module to the transceive antenna of the first transceiver module and forwarded to the signal measurement and adjustment block of the first transceiver module, and the transmit baseband signal generated by the common baseband processing unit and fed to the signal measurement and adjustment block located in the transmit signal processing chain of the of the first transceiver module; and operating the respective integrated signal measurement and adjustment blocks of the digital predistortion systems in the transmit signal processing chains of the first and second transceiver modules at a higher sampling rate and dynamic range than available for the common baseband processing unit.

16. A method for measuring timing offsets in a multi-transceiver system for use in a wireless multiple-input multiple-output spatial multiplexing or a smart antenna system, the multi-transceiver system comprising a first transceiver module and one or more independently controllable second, third and optional further transceiver modules, each of the transceiver modules comprising a respective transceive antenna and at least one respective transmit signal processing chain, each of the signal processing chains being connected to a common baseband processing unit, the baseband processing unit generating the same baseband signal to each transmit signal processing chain, the method comprising:

measuring amplitude, timing and phase offsets by a signal measurement and adjustment block integrated into a digital predistortion system in the transmit signal processing chain of the second transceiver module, the offsets being measured between an a radio-frequency (RF) signal generated in the first transceiver module, the signal being coupled via an antenna loop from the transceive antenna of the first transceiver module to the transceive antenna of the second transceiver module, and forwarded to the signal measurement and adjustment block, and the corresponding transmit baseband signal of the RF signal, the transmit baseband signal being generated by the common baseband processing unit and provided to the signal measurement and adjustment block of the second transceiver module;

measuring further amplitude, timing and phase offsets by the signal measurement and adjustment block between at least one further RF signal generated in the third transceiver module or any one of the optional further transceiver modules, the signal being coupled via a reverse antenna loop from the transceive antenna of the third transceiver module or any one from the optional further transceiver modules to the transceive antenna of the second transceiver module and forwarded to the signal measurement and adjustment block, and the transmit baseband signal;

comparing the measurements with each other; and interpreting final amplitude, timing and phase differences between each pair of these measurements as the amplitude, timing and phase difference between the first RF signal and the at least one further RF signal at the transceive antenna of the second transceiver module, wherein the integrated signal measurement and adjustment block of the digital predistortion system in the transmit signal processing chain of the second transceiver module is configured to operated at a higher sampling rate and dynamic range than available for the common baseband processing unit.

17. The method according to claim 16, further comprising cyclically changing the roles of a measuring transmit signal processing chain and the transmit signal processing chains to be compared and repeating an amplitude, timing and phase offset measurement for at least N−1 separate Tx signal chains acting in the role of the measurement chain, wherein N is an integer representing the total number of operated Tx signal processing chains, wherein each RF signal generated in a corresponding one of the transmit signal processing chains to be compared is looped from said transmit signal processing chain to the respective measurement chain at least once during a full measurement cycle of the at least N−1 measurements.

18. The method according to claim 16, further comprising cyclically changing roles of a measuring transmit signal processing chain and the transmit signal processing chains to be compared and repeating an amplitude, timing and phase offset measurement for at least N−1 separate transmit signal chains acting in the role of the measurement chain, wherein N is an integer representing the total number of operated Tx signal processing chains, such that each RF signal generated in a corresponding one of the transmit signal processing chains to be compared has been looped from the transmit signal processing chain to the respective measurement chain at least once during the full measurement cycle of the at least N−1 measurements.

19. The method according to claim 18, further comprising (i) generating a transmit antenna beam with known characteristics with all transmit signal processing chains being active, (ii) performing a measurement or several measurements, and (iii) storing the measured and calculated amplitude, timing and phase differences to a non-volatile memory for each triplet of transmit signal processing chains consisting of a measuring transmit signal processing chain and the transmit signal processing chains to be compared in terms of their amplitude, timing and phase offsets which is involved to generate a data base of optimal amplitude, timing and phase offsets in the smart antenna system.

20. The method according to claim 16, further comprising (i) generating a transmit antenna beam with known characteristics with all transmit signal processing chains being active, (ii) performing a measurement or several measurements, and (iii) storing the measured and calculated amplitude, timing and phase differences to a non-volatile memory for each triplet of transmit signal processing chains consisting of a measuring transmit signal processing chain and the transmit signal processing chains to be compared in terms of their amplitude, timing and phase offsets which is involved to generate a data base of optimal amplitude, timing and phase offsets in the smart antenna system.

21. The method according to claim 16, wherein the operation is performed for use in the wireless multiple-input multiple-output spatial multiplexing system or a smart antenna system according to at least one of GSM, UMTS, WiMAX or LTE standards.

22. The method according to claim 21, wherein the method is applied in a production calibration process during manufacturing of a multi-transceiver system architecture, and wherein transmit signal processing chains for transmitting the RF signals having amplitude, timing and phase offsets are to be measured are transmitted at least one of simultaneously or sequentially.

23. The method according to claim 21, wherein further transmit chains including the measuring chain are tunable to (i) another channel frequency or another band or (ii) switched off momentarily.

24. The method according to claim 21, further comprising, when applied in at least one of a WCDMA/TDD, LTE, WiMAX or GSM system, utilizing a time division i by allocating other traffic to different resources or time slots from ongoing measurement data.

25. The method according to claim 21, further comprising, when applied in a CDMA-based system, differentiating the signals from separate transmit chains by using different coding in measurement paths and further signal paths.

26. The method according to claim 21, wherein at least one first set of the measurements is executed sequentially and at least one second set of the measurements runs parallel.

27. The method according to claim 21, where more than two of the transmit signal processing chains are measured by at least some of the measuring transmit signal processing chains to obtain additional measurement data.

28. The method according to claim 27, wherein operations are performed according to at least one of GSM, UMTS, WiMAX or LTE standard.

29. The method according to claim 21, wherein measurements between the transmit signal processing chains connected to antenna elements that are located in a close proximity to each other in an antenna panel are usable, and wherein the measurements are executable for the antenna elements that are more distant with respect to one another.

30. The method according to claim 29, wherein further transmit chains including the measuring chain is tunable to (i) another channel frequency or another band or (ii) switched off momentarily.

31. The method according to claim 29, further comprising, when applied in at least one of a WCDMA/TDD, LTE, WiMAX or GSM system, utilizing a time division i by allocating other traffic to different resources or time slots from ongoing measurement data.

32. The method according to claim 29, further comprising, when applied in a CDMA-based system, differentiating the signals from separate transmit chains by using different coding in measurement paths and further signal paths.

33. The method according to claim 29, wherein at least one first set of the measurements is executed sequentially and at least one second set of the measurements runs parallel.

34. The method according to claim 29, where more than two of the transmit signal processing chains are measured by at least some of the measuring transmit signal processing chains to obtain additional measurement data.

35. The method according to claim 29, wherein measurements between the transmit signal processing chains connected to antenna elements that are located in a close proximity to each other in an antenna panel are usable, and wherein the measurements are executable for the antenna elements that are more distant with respect to one another.

36. The method according to claim 29, further comprising, when applied in a calibration process during a running field calibration session of a multi-transceiver system architecture, performing a field calibration procedure at least one of (i) when the smart antenna system is activated in the field or (ii) after each reset and/or partial reset of smart antenna system.

37. The method according to claim 36, further comprising detecting a degradation of one or more single transceiver modules using multiple antenna loops, connecting the one or more detected transceiver modules, and detecting a signal path which includes the degraded part that provides a worse performance than any signal path that excludes a part associated with the degradation.

38. The method according to claim 29, wherein the operation is performed during a run-time field calibration procedure of a multi-transceiver system architecture.

39. The method according to claim 21, further comprising, for production calibration, storing the obtained measurement data in a non-volatile memory integrated into the smart antenna system, and providing the measurements to a particular network element connected to the base transceiver station or an external memory device is connected to or disconnected from the smart antenna system.

40. The method according to claim 21, further comprising calibrating the multiple-input multiple-output spatial multiplexing system or the smart antenna system in a field operation, wherein measurement steps are performed using the transmit chains when collecting the measurement data from the measurement steps, wherein
    in a first step one of two selected transceiver chains to be measured is selected as a "calibrated transceiver" and the other one of the two selected transceiver chains to be measured is selected as a "non-calibrated transceiver", the amplitude, timing and phase offset measurement between the selected transceiver chains is executed and the obtained result is compared to the corresponding measurement result of the production calibration data,
    a difference between the field measurement value and the corresponding production calibration data value, the difference representing the amplitude, timing and phase error to be compensated, is corrected by changing the amplitude, timing and phase of the transmit signal of the non-calibrated transceiver by a calculated error,
    the measurement is repeated after the correction is made, the correction being implemented in an iterative way, and the impact of the correction is verified with new measurement data to reach a minimum residual error between the factory calibration value and the field measurement value, and
    after the first measurement step, the transceiver chains are considered as "calibrated transceivers" and at least one of the transceiver chains is used as a "calibrated transceiver" to calibrate further non-calibrated transceiver chains,
    wherein the field calibration sequence is continued by stepping through the at least N−1 measurement steps such that the measuring transceiver is changed in each measurement step and all of the transceiver chains have been calibrated against the calibrated transceiver.

41. The method according to claim 21, further comprising measuring random transceiver module pairs periodically and confirming phase adjustments if predetermined threshold values are exceeded.

42. The method according to claim 21, further comprising utilizing antenna loops between particular transceiver modules, and routing the received RF signal to the common baseband processing unit or to the signal measurement and adjustment block in the transmit signal processing chain of the measuring transceiver such that the currently transmitted on-air signal quality is measurable, wherein, for more than two transceiver modules, any failure of the transmitting antenna lines or antennas is detectable by implementing antenna loops between corresponding transceivers, and wherein, for three or more transceiver modules, and exact position of a failure is determinable.

* * * * *

UNITED STATES PATENT AND TRADEMARK OFFICE
CERTIFICATE OF CORRECTION

| | | |
|---|---|---|
| PATENT NO. | : 8,045,926 B2 | Page 1 of 1 |
| APPLICATION NO. | : 12/252166 | |
| DATED | : October 25, 2011 | |
| INVENTOR(S) | : Risto Martikkala et al. | |

It is certified that error appears in the above-identified patent and that said Letters Patent is hereby corrected as shown below:

Column 29, Line 4, In Claim 15, before "first" delete "of the". (Second Occurrence)

Signed and Sealed this
Fourteenth Day of February, 2012

David J. Kappos
*Director of the United States Patent and Trademark Office*